United States Patent [19]

Bruckbauer et al.

[11] Patent Number: 5,244,941
[45] Date of Patent: Sep. 14, 1993

[54] ARTIFICIAL STONE COMPOSITIONS, PROCESS OF PRODUCING THE SAME, AND APPARATUS EMPLOYED IN THE PRODUCTION THEREOF

[75] Inventors: Gerald J. Bruckbauer; Charles M. Belson; Joseph A. Ingriola; Anthony J. Woytek, all of Temple, Tex.

[73] Assignee: Ralph Wilson Plastics Company, Temple, Tex.

[21] Appl. No.: 431,058

[22] Filed: Nov. 2, 1989

[51] Int. Cl.$^5$ .............................................. C08K 3/36
[52] U.S. Cl. .................................... 523/171; 523/513
[58] Field of Search ............................... 523/171, 513

[56] References Cited

U.S. PATENT DOCUMENTS

| | | | |
|---|---|---|---|
| 3,668,139 | 6/1972 | Daniels et al. | 528/308 |
| 3,711,572 | 1/1973 | Stahly et al. | 523/508 |
| 4,193,908 | 3/1980 | Hsieh et al. | 523/513 |
| 4,251,640 | 2/1981 | Schroeder et al. | 528/280 |
| 4,374,215 | 2/1983 | Atkins | 523/514 |
| 4,544,584 | 10/1985 | Ross et al. | 523/171 |
| 4,595,626 | 6/1986 | Brubaker et al. | 523/513 |
| 4,678,819 | 7/1987 | Sasaki et al. | 523/171 |
| 4,829,103 | 5/1989 | Oda et al. | 523/220 |
| 4,873,274 | 10/1989 | Cummings et al. | 523/500 |
| 4,961,995 | 10/1990 | Ross et al. | 428/409 |
| 5,043,377 | 8/1991 | Nogi et al. | 524/437 |
| 5,049,597 | 9/1991 | Howard, Jr. | 523/457 |

FOREIGN PATENT DOCUMENTS

| | | |
|---|---|---|
| 0118031 | of 1984 | European Pat. Off. . |
| 0189098 | of 1986 | European Pat. Off. . |
| 0279575 | of 1988 | European Pat. Off. . |
| 58-189215 | 11/1983 | Japan .................................... 523/171 |
| 60-199053A | of 1985 | Japan . |
| 83003223 | 9/1983 | PCT Int'l Appl. .................. 264/255 |

OTHER PUBLICATIONS

"Modern Plastics Encyclopedia", McGraw-Hill, pp. 229–231, (1968).

Primary Examiner—Paul R. Michl
Assistant Examiner—Edward J. Cain

[57] ABSTRACT

A molding composition which, when cured, is useful as an artificial stone composition, is disclosed. The composition comprises between about 10 to about 25 parts by weight of a non-volatile polyester backbone resin; between about 10 to about 25 parts by weight of an ethylenically unsaturated monomer and between about 50 to about 80 parts by weight of a filler selected from the group consisting of alumina trihydrate, borax, hydrated magnesium calcium carbonate and calcium sulfate dihydrate. When an artificial stone composition simulating granite is desired, the molding composition further comprises chips of a previously cured thermosetting resinous composition. The compositions are produced in a vented but essentially closed mold through which heating and cooling media can freely flow.

37 Claims, 14 Drawing Sheets

ARTIFICIAL STONE COMPOSITIONS, PROCESS OF PRODUCING THE SAME, AND APPARATUS EMPLOYED IN THE PRODUCTION THEREOF

BACKGROUND OF THE INVENTION

This invention relates to artificial tone compositions including those simulating marble and granite, processes of preparing articles therefrom, and apparatus employed in the production of the same. Such articles may be used in such household, commercial, and industrial applications in which durable decorative surfaces are desired, such as as kitchen countertops, table tops and bathroom vanities.

The prior art discloses simulated stone compositions and processes of preparing articles therefrom. For example, U.S. Pat. No. 4,446,177 and Australian Patent Publication S.N. 8665193 disclose compositions comprising a matrix of polyester and alumina trihydrate. U.S. Pat. No. 4,085,246 discloses a simulated granite article comprising alumina trihydrate and polymethylmethacrylate having opaque and translucent particles randomly distributed therein. Further, U.S. Pat. No. 4,433,070 discloses a polishable marble surface comprising a polyester resin derived from isophthalic acid, a glycol and, as crosslinking monomer, either styrene or methyl methacrylate.

The articles disclosed in U.S. Pat. No. 4,446,177 were produced by first coating a polyester gel coat into a mold and then applying the polyester veining matrix, and, subsequently, a backing layer. See also U.S. Pat. No. 4,664,954. Such processes are tedious and render a product having neither uniform cure or uniform color.

A need exists for an artificial stone composition and a method of making such compositions which when fully cured exhibit uniform satisfactory physical properties. A need also exists for a process of making such compositions which is relatively simple and economical.

SUMMARY OF THE INVENTION

The invention is drawn to molding compositions and cured products made therefrom, processes for preparing such products, and apparatus employed in the production of such products. The cured products of this invention simulate stone and are highly useful in the manufacture of durable decorative protective surfaces.

The thermosettable molding composition of this invention comprises a non-volatile polyester backbone resin and an ethylenically unsaturated monomer in a ratio of from about 1:2.5 to about 2.5:1 parts by weight. In the preferred embodiment, a filler is included such that the composition comprises between about 10 to about 25 parts by weight of a non-volatile polyester backbone resin; between about 10 to about 25 parts by weight of an ethylenically unsaturated monomer and between about 50 to about 80 parts by weight of a filler, preferably a hydrated mineral selected from the group consisting of alumina trihydrate, borax, hydrated magnesium calcium carbonate and calcium sulfate dihydrate. Such compositions when cured simulate artificial stone such as marble.

A second molding composition of this invention contains, in addition to the thermosettable composition recited above, discrete chips. Such chips may be the fully or partially cured product of the thermosettable molding composition of this invention or may be chemically distinct therefrom. When cured, such second molding compositions simulate such artificial stone such as granite and onyx.

The invention further includes a process of preparing such artificial stone compositions which comprises mixing a resinous composition comprising a polyester; one or more ethylenically unsaturated monomers; catalyst, accelerator, promoter or other curing agent; colorant, if desired; and filler, if desired (and, when simulated granite or onyx is desired, chips of an inorganic material or of a partially or fully cured synthetic resin such as the molding composition of this invention); de-aerating the mixture; flowing the mixture under airless conditions into a vented but essentially closed mold defined by a boundary frame and by platens through which heating media flows; and partially or fully curing the composition in the mold. If desired, curing can be completed outside the mold cavity, in an oven or in a platen press which may correspond in configuration to the mold, or which may further mold the partially cured composition to an altered configuration.

The invention further provides a mold bounded by platens suitable for use in the production of artificial stone compositions with a means of uniformly regulating the temperature during the curing stage.

DETAILED DESCRIPTION OF THE INVENTION

Figure 1:
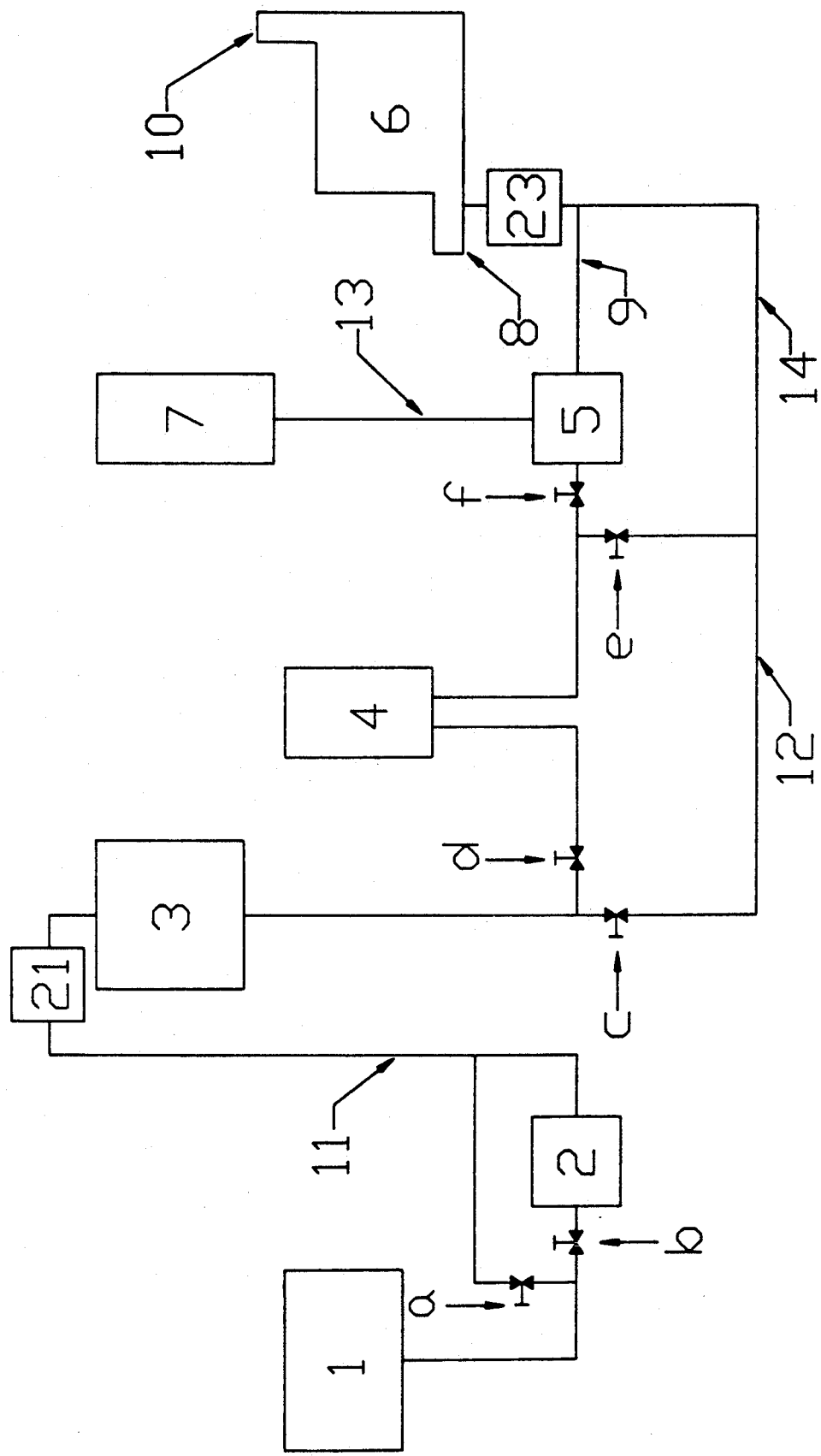
FIG. 1 is a diagram of the components of the system used to perform the process according to the invention.

The composition of this invention is drawn to a synthetic resinous system which when fully cured simulates stone. Such cured compositions exhibit a Flame Spread Index (ASTM E84-87) less than 25.0 and a Smoke Index (ASTM E84-87) less than 25.0, and a Barcol hardness of greater than about 50. Barcol hardness is measured by a Barcol impresser, U.S. Pat. No. 2,372,662, manufactured by Barber-Colman Co., Rockford, Ill., Part No. 934-1. The Barcol hardness scale is linear. A Barcol value of 0 indicates a 30 mil penetration by the impresser's test probe. A Barcol value of 100 indicates no measurable penetration. Surfaces suitable for table top and countertop applications should have a Barcol value of at least 55.

The first molding composition of this invention comprises a non-volatile polyester backbone resin and an ethylenically unsaturated monomer in a ratio of from about 1:2.5 to about 2.5:1 parts by weight. Examples of such compounds, and methods of their preparation, are set forth in U.S. Pat. No. 3,980,731, the teachings of which are incorporated herein by reference. It is preferred that a filler be included in the composition, such that the ultimate composition comprise between about 10 to about 25 (most preferably 14 to 18) parts by weight of a non-volatile polyester, between about 10 to about 25 (most preferably 15 to about 22) parts by weight of an ethylenically unsaturated monomer, and between about 50 to about 80 (most preferably between about 60 to about 70) parts by weight of a filler.

When an acid that contains more than one —COOH group reacts with an alcohol that contains more than one —OH group, the product is a polyester. The reaction is called condensation polymerization, since monomer molecules are combined with the loss of simple molecules such as water or methanol.

A generally rigid polyester is desired, formed of highly cross-linked molecules rather than linear molecules of the sort valuable in the manufacture of polyester for fiber applications. The polyester employed in the composition of this invention is preferably a polycondensation product of polycarboxylic acids including the dicarboxylic acids (as herein defined) and polyhydric alcohols. Preferably, the polyester is derived from at least two dicarboxylic acids and at least one glycol. Most preferably, at least one of the dicarboxylic acids is an acyclic ethylenically unsaturated acid. Such dicarboxylic acids include those selected from the group consisting of maleic, fumaric, linoleic, linoleic, itaconic, sebacic, tartaric, tetrachlorophthalic and oleic acid and anhydrides thereof. Maleic anhydride is especially preferred because of its availability. The other dicarboxylic acid is aromatic and is most preferably either isophthalic, adipic, azelaic, phthalic acid or anhydrides thereof. Most preferred is isophthalic acid, because it lends greater chemical resistance to the molded product. Adipic acid may be used when a more flexible product is desired.

The glycols which react with the dicarboxylic acids to form the polyester are preferably selected from at least one $C_2$-$C_8$ glycol and include neopentyl glycol, 1,4-butanediol, ethylene glycol, diethylene glycol, propylene glycol, dipropylene glycol, 1,3- and 2,3-butylene glycol, butylene trimethylene glycol, 1,6-hexanediol, 1,4-cyclohexanediol, and triethylene glycol. The polyester backbone is produced under condensation reaction conditions well known in the art.

Suitable ethylenically unsaturated monomers for reaction with the polyester include alkyl acrylates and methacrylates wherein the alkyl groups comprise from 1 to about 18 carbon atoms, preferably between 1 to about 4 carbon atoms. Suitable acrylic monomers are methyl acrylate, ethyl acrylate, methyl methacrylate, ethyl methacrylate, n-propyl acrylate, n-propyl methacrylate, i-propyl acrylate, n-propyl methacrylate; n-butyl, 2-butyl, i-butyl and t-butyl acrylates and methacrylates; 2-ethylhexyl acrylate and methacrylate; cyclohexyl acrylate and methacrylate; hydroxyalkyl acrylates and methacrylates; N,N-dialkylaminoalkyl acrylates and methacrylates; and N-[t-butyl]aminoethyl acrylates.

Other ethylenically unsaturated monomers include such preferred compounds as styrene, vinyl toluene, vinyl acetate, acrylonitrile, methacrylonitrile, maleic acid, maleic anhydride and esters of maleic acid, acryl amide, methacrylamide, itaconic acid, itaconic anhydride and esters of itaconic acid and other multifunctional monomers; alkylene diacrylates and dimethacrylates; allyl acrylate and methaacrylate; N-hydroxymethylacrylamide and N-hydroxymethylmethacrylamide; N,N'-methylene diacrylamide and dimethacrylamide; glycidyl acrylate and methacrylate; diallyl phthalate; divinylbenzene; p-tert butylstyrene; divinyltoluene; trimethylolpropane triacrylate and trimethacrylate; pentaerythritol tetraacrylate and tetramethacrylate; triallyl citrate and triallyl cyanurate.

Two or more of the above monomers may be combined to be the "ethylenically unsaturated monomer" referred to herein. Styrene, vinyl toluene, diallyl phthalate, vinyl acetate, and methyl methacrylate are preferred. Particularly preferred are a combination of styrene and methyl methacrylate, most preferably wherein the weight ratio is between from about 2:1 to about 1:4, respectively, and most preferably between from about 1:1 to about 1:2. If it is desired to reduce the rate of reaction, a small amount (from about 10 ppm to about 500 ppm) of an inhibitor, such as methyl ethyl hydroquinone, can be included in the reaction mixture to initially inhibit the reaction of the methyl methacrylate.

Matrix fillers may be any materials which yield the desired visual, chemical, and physical properties in the molded product. When a product of homogeneous appearance is desired, the filler should be sufficiently small in particle size, and be sufficiently dispersed in the matrix, that discrete particles or agglomerates of particles are not visible. When a product bearing the speckled appearance of granite is desired, the size, configuration, and concentration of the filler particles is a matter of choice dependent on the desired visual, chemical, and physical characteristics of the molded product. Preferably, for a granite appearance, a visually indistinct matrix filler is employed, as well as visible discrete chips of resinous material which themselves include filler particles.

When a product with less visually distinct filler characteristics is desired, such as a product bearing the appearance of striated marble, a visually indistinct matrix filler is employed, as well as pigmented or unpigmented resin in uncured or partially cured semi-liquid form to form the striations.

The composition of the filler also affects the physical and chemical properties of the molded product, such as physical strength, stain resistance, hardness, and fire retardancy. The filler may comprise any material which is, or can be made, compatible with the reactive materials, and which imparts the desired characteristics to the molded product. Satisfactory fillers include inert inorganic or organic material, such as finely ground stone, talc, mica, wollastonite, kaolin, silica, calcium carbonate, calcium sulphate, glass (spheres and fibers), metals, antimony oxide, or resin of the type comprising the composition of this invention.

In a molded product in which fire retardancy is of concern, the matrix fillers can comprise materials such as halogenated compounds and metal oxides, which decompose to deprive the flame front of oxygen; antimony trioxide or antimony pentoxide; polybrominated diphenyloxides; organophosphorous compounds; antimony-halogen-molybdenum systems; and alumina trihydrate. Preferred are materials which are capable of releasing water molecules at moderately elevated temperatures of from about 300° F. to about 700° F. Such fillers include compounds which chemically bind water molecules, such as alumina trihydrate (aluminum hydroxide) and other hydrated materials capable of releasing water molecules when heated. Such fillers also include borax, hydrated sodium borate, hydrated magnesium, calcium carbonate and calcium sulfate dihydrate. Alumina trihydrate is especially preferred.

If smoke suppression is desired, the fillers can comprise alumina trihydrate, magnesium oxide, zinc oxide, borates, and molybdenum compounds.

Alternatively, to provide fire retardancy and/or smoke suppression, water may be bound physically rather than chemically in the filler. For example, such fillers include hollow glass beads filled with water, and polymers having water molecules physically bound within their interstices.

It is generally preferred to maximize the loading of filler particles in the composite, because the filler is usually less expensive than the resin, and because some properties, such as fire retardancy, are partly a function of filler loading. The maximum loading is usually a function of the viscosity of the molding composition, and the desirability of ensuring that all filler particles are coated with resin. With a given particle size distribution, as filler loading increases, the composition increases in viscosity and becomes more difficult to handle and is less likely to conform to mold configurations. For a product resembling marble, the preferred composition comprises, based on weight, from about 10% to about 25% polyester resin, from about 5% to about 12% styrene, from about 5% to about 12% methyl methacrylate, and from about 51% to about 80% alumina trihydrate. For such a product, the most preferred composition, based on weight, comprises about 12% to about 18% polyester resin, from about 5% to about 7% styrene, from about 7% to about 11% methyl methacrylate, and from about 62% to about 76% alumina trihydrate.

The filler particle size and configuration affects the viscosity of the molding composition during operation, the visual characteristics of the product, the amount of filler that can be employed, and the internal strength and stain resistance of the cured product. Particles larger than about 50 microns in length are visible to the naked eye. The filler particle size for a homogenous-appearing marble-like product is usually desired to be a maximum of about 25-30 microns in length. In addition, when a white or light colored composition is desired, it is preferred to filter the composition at least once prior to introduction to the mold, to remove visible contaminants. The filters are preferably sized to remove particles larger than about 50 microns, and most preferably, larger than about 40 microns. For these reasons, the filler particles will preferably range from about 0.1 to about 40 microns. The mean filler particle diameter is preferably between about 5 to about 20 microns, with particles at least as small as 0.5 microns and at least as large as 30 microns. A particle size distribution which allows the largest proportion by volume of particles within a given volume of molded product is preferred (i.e., which allows smaller particles to substantially fill the interstices between larger particles), because it allows a higher loading of filler particles at workable composition viscosities. It is preferred that at least about 5% of the particles be larger than about three times the mean particle size, and at least about 5% of the particles be smaller than about one-third the mean particle size. Distributions have been found effective in which about 5% of the particles have been greater than about ten times the mean particle size and about 5% of the particles have been less than about one-tenth the mean particle size. A generally bell-shaped particle size distribution is most preferred.

It is understood that in referring to the filler as comprising particles, configurations such as fibers (e.g., chopped glass fibers) are included. In particular, in applications in which strength is particularly desired, fibrous fillers are desirable.

A molded product simulating a heterogeneous-appearing material such as granite or onyx, comprises discrete visible chips distributed throughout a matrix. Such a product may be made from a molding composition comprising a matrix of the thermosettable molding composition set forth in detail above, within which are dispersed discrete chips of a previously partially or fully cured resin or of some other material generally compatible with the molding composition (either by themselves, by coating the chips with monomer, or by application of a conventional coupling agent such as silane, found especially useful in melamine and polyester applications). The amount of chips, as well as their shape, size, and composition, are dependent upon the appearance, physical, and chemical characteristics desired of the final cured product. It is preferred that the chips be larger than about 50 microns, since chips smaller than about 50 microns are generally not visually discernable as discrete particles, but rather appear as colorants. The maximum chip size is primarily a function of esthetics. It is preferred to employ chips between about 250 microns and about 25,000 microns.

The chips may comprise particulate inorganic material, such as stone particles, chips of a resinous material, pigmented if and as desired, or a combination of such materials. Resinous particles are preferably at least partially cured prior to incorporation into the matrix to maintain the particles visually distinct from the matrix.

The chips may also be the cured thermosetting resinous reaction product of the first molding thermosettable composition of this invention. Thus, scrap material resulting from the manufacture of such artificial stone compositions, as for example, artificial marble, may be ground into chips and employed in the procuction of compositions simulating granite. Preferably, between about 1 to about 50 parts by weight of discrete chips of a cured thermosetting resinous system are employed. Most preferably, the weight percentage of chips of the cured resinous composition comprises approximately 2 to about 25 weight percent of the total weight of the second molding composition. Particularly preferred as the granite composition of this invention is the cured reaction product of the molding composition comprising between about 10 to about 25 parts by weight of non-volatile polyester, between about 10 to about 25 parts by weight of ethylenically unsaturated monomer, between about 50 to about 80 parts by weight of filler and between about 2 to about 25 parts by weight of discrete chips. Most preferred is a composition comprising from about 12 to about 18 parts by weight polyester, from about 5 to about 9 parts by weight styrene, from about 7 to about 11 parts by weight methyl methacrylate, from about 60 to about 70 parts by weight alumina trihydrate, and from about 2 to about 15 parts by weight discrete chips.

The physical and chemical properties of the molded product are a function of the properties of both the matrix and the chips. Fire retardancy can be increased by employing chips having a greater flame resistance than the matrix. Inorganic chips, such as stone, may be used. However, although they do not provide fuel, they do not contribute substantially to flame retardancy because they lack the water of hydration for flame extinguishing. Inorganic chips may also be porous, allowing them to absorb foreign materials at the surface of the ultimate product, giving the product low resistance to staining. In addition, such chips may yield a product with undesirable structural characteristics, which may be relatively easy to fracture, and which may be difficult to polish or cut, because of the substantially different hardness of the chips and matrix.

The molding compositions of this invention may be cured by any conventional or convenient means. Polymerization of unsaturated polyester with monomer(s) (e.g., styrene and/or methyl methacrylate) can be effected by the use of curing agents which generate free radicals during decomposition, to initate cross-linking of the polyester and the monomer(s). Generally, between about 0.15 to about 3.0 weight percent of curing agent based on total weight of the resin (e.g., polyester, styrene, and methyl methacrylate) is employed. Suitable curing agents for polyesters and the ethylenically unsaturated monomers defined herein are well known in the art.

Preferred free radical generators include organic peroxides such as peroxy esters, peroxy ketals, peroxy dicarbonates, diacyl peroxides, hydroperoxides, ketone peroxides, and dialkyl peroxides. Especially preferred is a mixture of mono-peroxy ester or di-peroxy ester and peroxy ketal. Organic peroxides are prepared by conventional means. See, for example, U.S. Pat. No. 4,052,465.

Organic peroxides which act at ambient temperature may be used. Such peroxides are dissociated using promoters or acclerators. Examples are hydroperoxides, ketone peroxides, and some diacyl peroxides. Ketone peroxides and hydroperoxides are usually used with cobalt salts, such as cobalt naphthenate, and cobalt octoates. Diacyl peroxides, such as benzoyl peroxides, are used with aromatic tertiary amines such as diethyl aniline or dimethyl aniline.

It is desired that substantially no catalyzation occur prior to introduction of the reaction mixture into the mold. For that reason, heat-activated curing agents are preferred to non-heat activated accelerators or promoters. Preferred are those curing agents which are heat activated and capable of functioning in the absence of a non-heat activated accelerator or promoter, and which render a composition having a shelf life of at least 2 hours, and preferably at least 24 hours, at 77° F. Especially preferred are curing agents which are activated by heat in the range of from about 100° F. to about 450° F., and preferably from about 150° F. to about 250° F., so that substantial catalyzation does not begin until the catalyzed reaction mixture is heated in the mold.

Especially preferred is a mixture of a curing agents with a low initiation temperature, between from about 100° F. and about 200° F., and a curing agent having a higher initiation temperature, between about 150° F. and about 250° F. The low initiation temperature curing agent begins the polymerization reaction, which is exothermic. The higher initiation temperature curing agent is activated by the heat of the exothermic reaction, and completes the polymerization. The appropriate ratio of low temperature activated curing agent and high temperature activated curing agent is determined by the desired rates of reaction and the physical properties desired of the molded product. Generally, lower temperatures and a slower cure rate produce a product with better physical characteristics, perhaps in part because a slower rate of reaction produces longer chain polymers. Faster cure rates reduce the time in the mold. In general, however, a rapid exothermic reaction reduces control over cure, which can result in stress cracking in the molded part because of non-uniform shrinkage during cure. It is preferred to employ only sufficient low temperature initiated curing agent to generate sufficient heat to activate the second curing agent and to sufficiently polymerize the reaction mixture so that volatile constituents are not vaporized by the heat of the reaction.

To reduce the amount of time in the mold, it is preferred that the temperature of the composition increase as the polymerization progresses. The maximum temperature of the molding composition at any time during the curing cycle should be below the temperature at which any of the remaining raw materials or intermediate products violatilizes or decomposes to products which yield poor physical characteristics, e.g., voids or discoloration.

Among suitable curing agents acting at elevated temperatures are benxoyl peroxide, 2,5-dimethyl-2,5-bis(2-ethyl hexyl peroxy)hexane, t-amyl peroxyoctoate, t-butyl peroxyoctoate, lauroyl peroxide, t-butyl peroxybenzoate, 1,1-bis-t-butyl peroxy cyclohexane, 1,1-bis-t-amyl peroxy cyclohexane, and dicuml peroxide. Best results have been obtained with 2,5-dimethyl-2,5-bis(2-ethylhexanoylperoxy)hexane and 1,1-di-t-butyl peroxy-3,3,5-trimethylcyclohexane, available from Akzo Chemicals as Trigonox 141 and Trigonox 29-B75, respectively. Preferably a mixture of these two curing agents in a weight ratio of from about 2:1 to about 1:20 is employed. The most appropriate ratio for any particular resin-filler composition of this invention is a function of the size and configuration of the mold and the heat transfer capabilities of the mold, and can be determined by simple trial and error. Most preferably the ratio of the two curing agents is between about 1:2 and about 1:4 for products up to about ½ inch in thickness, and between about 1:4 and 1:20 for products greater than about ½ inch in thickness, respectively.

Admixed with such components may be such additives well known to those skilled in the art as colorants (including organic and inorganic tinting agents, pigments, dyes, and metallic flakes), anti-settling agents, UV stabilizers or absorbers, antioxidants, fire retardant agents, viscosity control agents etc. Suitable UV stabilizers include o-hydroxyphenyl benzotrizoles, such as 2-hydroxyphenyl benzotriazole and 2-hydroxy 4-alkoxy benzophenones, and benzophenone, salicylates, cyanoacrylates, benzylidene, malonates, and oxalanilides. Expecially preferred is 2-(2-hydro 3,5di-t-amyl phenyl benzotriazole, available as Tinuvin 328 from Ciba Geigy. Especially preferred for the promotion of homogeneity and retarding settling of fillers are such thixotropic agents as organoclays (such as TIXOGEL PL-S, sold by United Catalysts Inc.) and fumed silica (such as CAB-O-SIL, sold by Cabot Corporation). Typically, only small amounts, if any, of such constituents are required. Suitable colorant concentrations are from about 0.05% to about 2%, based on the weight of the entire composition. Suitable thixotropic agent concentrations are from about 0.1% to about 2%, based on the weight of the entire composition.

Referring to FIG. 1, measured quantities of the polyester resin, ethylenically unsaturated monomer, and filler are mixed together in a mixing tank 1. The additives, if desired, and curing agents, may also be added to the mixing tank. Alternatively, curing agents, colorants, and other additives can be introduced into the process stream, as by in-line injection or mixing tank, at any convenient location between the mixing tank 1 and the mold 6. It is preferred that such constituents be added to the mixing tank, to assure proper portions of ingredients and thorough mixing. Most preferably, the mixing tank is equipped with a high speed dispersing blade (e.g., from Hockmeyer Equipment Corp., Harrison, N.J., or from Morehouse Industries, Inc., Fullerton, Calif.) to create a high shear environment to disaggregate any agglomerated filler particles, to intimately coat the individual particles with resin, and to provide a generally uniformly dispersed blend of materials.

From mixing tank 1 the admixture is then de-aerated, either in the mixing tank 1, as by applying a vacuum to the tank, or in a separate de-aeration device. In FIG. 1, the admixture is transferred by any convenient means to a de-aerating device, exemplified in FIG. 1 as hopper 3. Referring to the drawings, with valve a closed and valve b open, transfer can be accomplished by pump 2. With valve a open and valve b closed, transfer can be accomplished by suction (by creating a partial vacuum in hopper 3), by gravity (by elevating tank 1 above hopper 3), or by pressure fed (by pressurizing tank 1) or a combination thereof. The admixture flows through pipe 11 into the top of hopper 3, in which a partial vacuum is maintained by the continuous operation of a vacuum pump. The incoming material is immediately fragmented or exploded by the expansion and outflow of entrained air and falls as airless particles to the bottom of the hopper 3. Once de-aeration is complete, the de-aerated material may be transferred to mold 6 through pump 4 and mixing device 5, through pump 4 alone, or directly to mold 6, as shown in FIG. 2, FIG. 4, and FIG. 3, respectively, as explained more fully below.

It is preferred that the reaction mixture pass through at least one filter prior to entering mold 6, to ensure that undesired matter be removed prior to molding. It is especially preferred that two filters, 21 and 23, be employed as shown in FIG. 1. Such filters may be of any conventional type, preferably capable of removing particles of at least 50 microns in size, and preferably as small as 30 microns in size. Bag filters are especially preferred. Of course, such filters cannot be employed when making a granite product containing chips larger than the filter size, since the filters would remove the chips from the reaction mixture.

Figure 2:
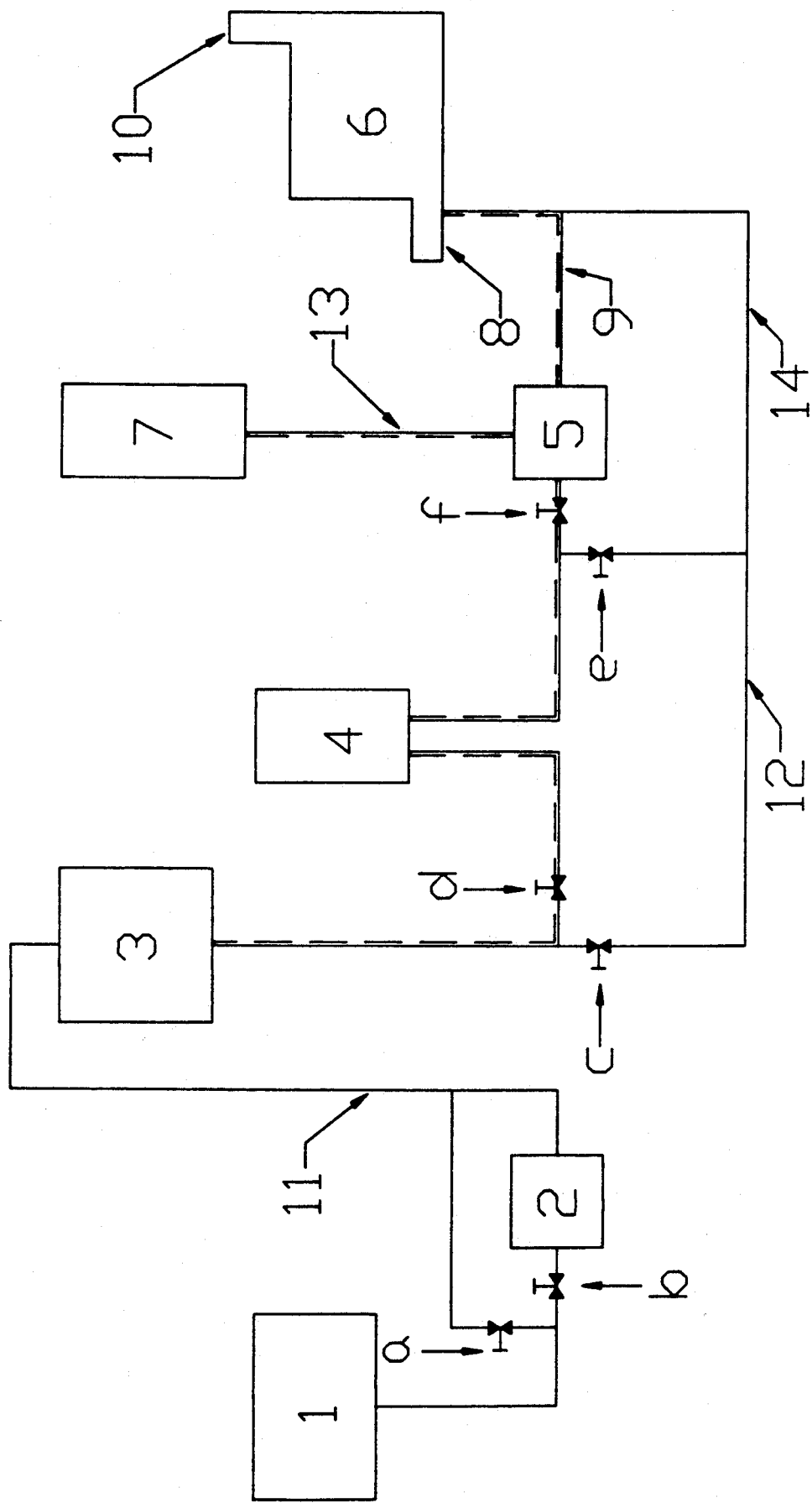
FIG. 2 is the diagram of FIG. 1, showing in dotted lines one process flow alternative.

As shown in FIG. 2 in dotted lines, the uncatalyzed reaction mixture is transferred by pump 4 through mixing device 5, wherein curing agent is injected by pump 7, to mold 6, with valves c and e closed and valve d and f open. The transfer can be accomplished by pump 4 alone, or by blocking the inlet to hopper 3 and thereafter pressurizing hopper 3. In the latter case, the pressure is typically between about 8 psi and 40 psi. (If pump 4 is a double diaghram pump, hopper 3 should not be pressurized, since its efficiency would be decreased).

Figure 3:
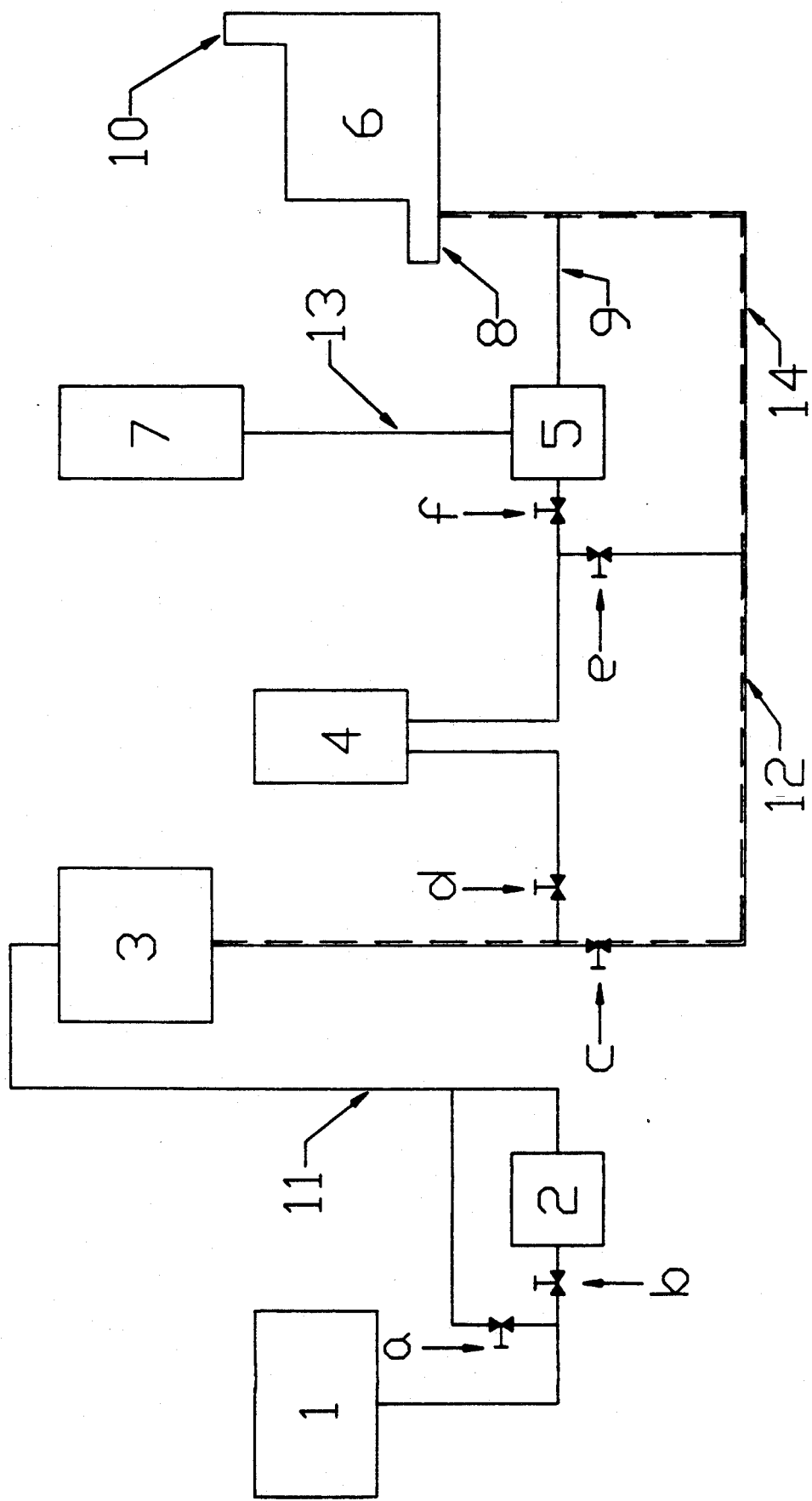
FIG. 3 is the diagram of FIG. 1, showing in dotted lines a second alternative flow scheme.
Figure 4:
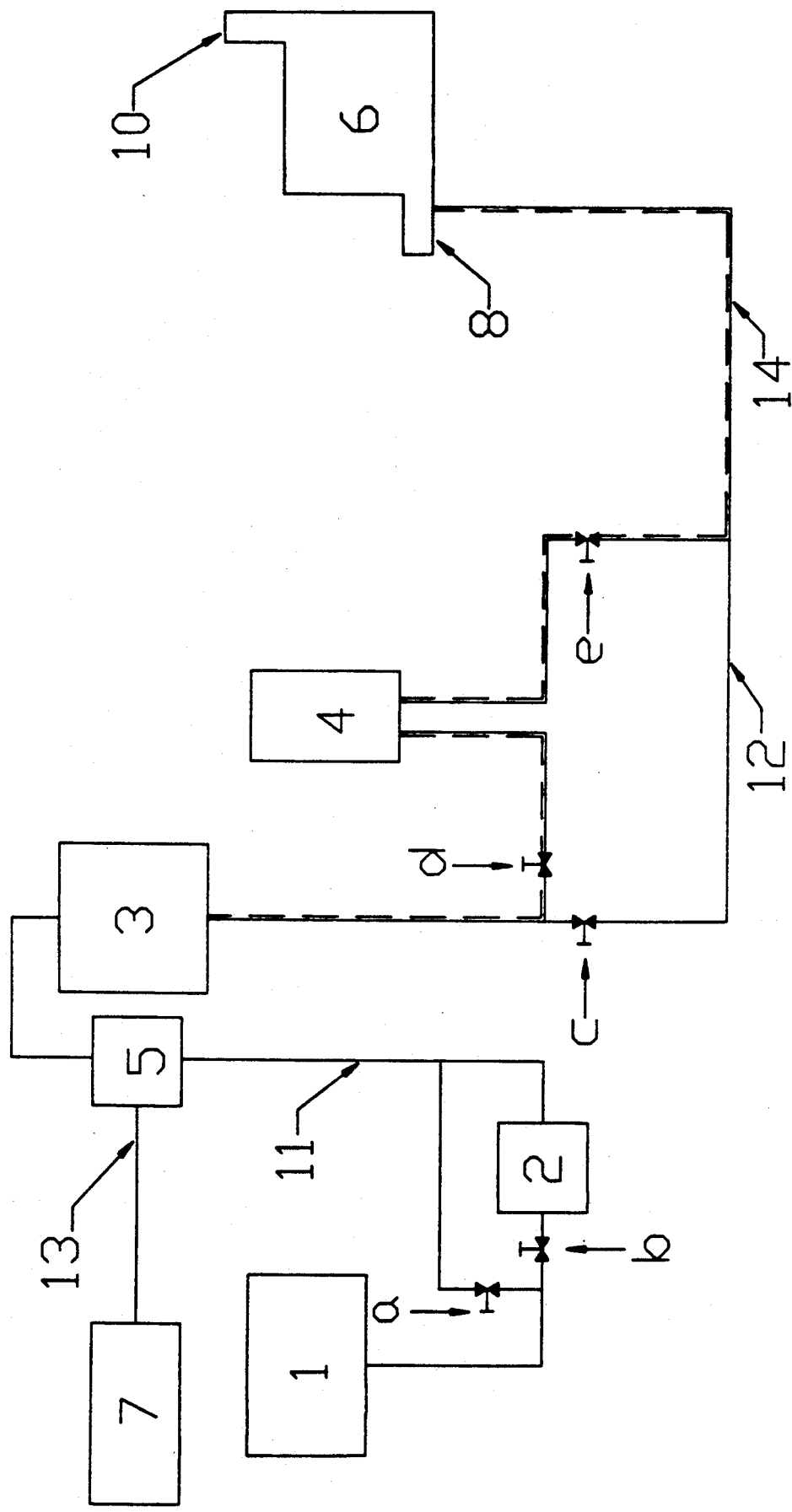
FIG. 4 is the diagram of FIG. 1, showing in dotted lines a third alternative flow scheme.

As shown in FIG. 3 in dotted lines, the catalyzed reaction mixture is transferred from hopper 3 directly to mold assembly 6 through open valve c (valves d and e being closed), as by pressurization of hopper 3 to between about 40 psi and about 100 psi. In FIG. 4, as show in dotted lines, the catalyzed reaction mixture is transferred from hopper 3 to mold assembly 6 by pump 4, valve c being closed and valves d and e being open. The mixture is removed from hopper 3 by pressurizing hopper 3, or by pump 4.

Pump 4 may be any convenient type of pump (driven by any convenient means such as air or hydraulic pressure, mechanical or electrical means), such as a volumetric piston pump, double diaphragm, or sine pump, all of which are commercially available. The pump should be capable of pumping liquid without the reincorporation of air into the mixture and without generating substantial heat. Preferred is a double diaphragm pump, such as the Sandpiper pump from Warren Rupp Houdaille, of Mansfield, Ohio. Such a pump is especially desired when the composition contains discrete chips as in the manufacture of granite or onyx, which could abrade or block other types of pumps.

The pumping rates are such that the system is kept full of the mixture, and thus free of air, until the mixture is delivered into the cavities of mold 6. Substantial amounts of entrained air would create voids in the molded product and at its surface, creating undesirable visual and physical characteristics.

The curing agent may be either mixed directly with the reaction mixture in mixing tank 1, or may be added to the reaction mixture by a metering pump at some point during processing. The former method is most appropriate to batch operations, in which the appropriate proportions of reaction mixture and curing agent are measured into mixing tank 1. An advantage to this method of curing agent addition is that it is not dependent on the accuracy of a metering pump. Regardless of where curing agent is introduced to the reaction mixture, the initiation temperature should be sufficiently high to avoid substantial curing within the lines prior to entry into the mold.

One method of in-line curing agent introduction is illustrated in FIG. 2, in which dotted lines are intended to show the flow from hopper 3 to mold assembly 6. The uncatalyzed reaction mixture is transferred from hopper 3 through valve d (valve c being closed) and is further transferred by pump 4 through valve f (valve e being closed) into mixing device 5. The curing agent is pumped via pump 7 through pipe 13 to the mixing device 5.

Mixing device 5 may be any convenient mechanism for thoroughly mixing the reaction mixture components without introducing substantial amounts of air into the mixture. For example, a tank with a rotating impeller or mixing blade, or a static mixer, are appropriate. The former is preferred when mixing compositions containing chips which might block a static mixer. Static mixers are preferred for compositions without chips, such as the composition described above for a homogenous marble-like product.

Static mixers have a means for the flowing material to divide and recombine and either a plurality of angularly and longitudinally spaced, obliquely disposed vanes or a plurality of plugs each pierced by a plurality of obliquely disposed bores. Such devices are conventional in the art.

Pump 7 is a metering pump, electronically or mechanically controlled (or synchronized) with pump 4 to deliver the appropriate proportion of curing agent to mixing device 5. From mixer 5, the curing agent passes into the mold via line 9. Thus, pump 7 introduces, though mixer 5, a minor, but accurately metered, portion of curing agent into the mixture. This method poses less of a risk of catalyzation within the processing lines and equipment when using a promotor or catalyst with a low initiation temperature, since the curing agent is injected immediately prior to the mold. However, the metering pump 7 must be sufficiently precise to continuously introduce the appropriate proportion of curing agent into the reaction mix.

An alternative method of in-line curing agent injection is shown in FIG. 4, in which the appropriate proportion of curing agent is injected by pump 7 through mixer 5 into the reaction mixture as it flows through line 11 before it enters hopper 3. The complete reaction mixture can be deaerated in hopper 3.

Figure 5:
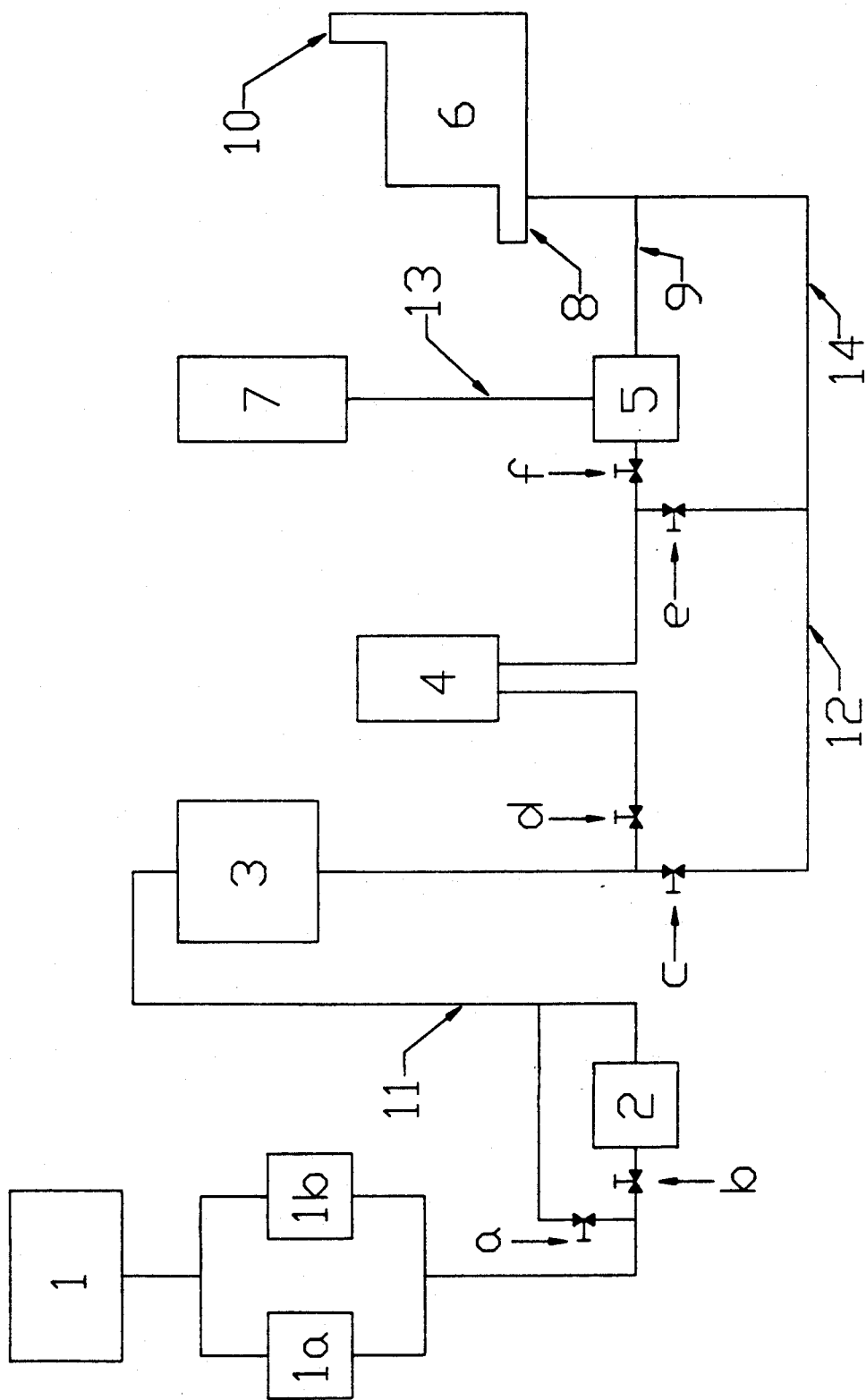
FIG. 5 is the diagram of FIG. 1, showing a fourth alternative flow scheme.

FIG. 5 represents yet another variation on the method of this invention. To produce product of different colors from one large master batch, the admixture from mixer 1 can be transferred to one or more color mixing vessels. FIG. 5 shows two such vessels, 1a and 1b, although any number of color mixing vessels could be employed. The admixture is transfered from mixer 1 to color mixing vessels 1a and 1b, in which different colorants are added in the desired amounts. The resulting admixture from vessel 1a or 1b, or from both 1a and 1b, is then processed in the same manner as described above. A single hopper 3 may be employed, or a separate hopper may be dedicated to each color to reduce the amount of cleanup require between runs of different colors.

Mold 6 is for forming sheet or panel material and has an inlet valve assembly 8 at the lower end of one side adapted to receive the admixture from pipe 9. At the upper end of an opposing side of said mold a riser means 10 is provided to vent the mold.

The mold assembly 6 for making sheets is a demountable structure preferably comprising a plurality of mold cavities with elevated vent ends. The vent is above the fill port and is higher than any portion of the mold. The platens defining the assembly have a means for regulating the temperature within the molding cavity.

Figure 6:
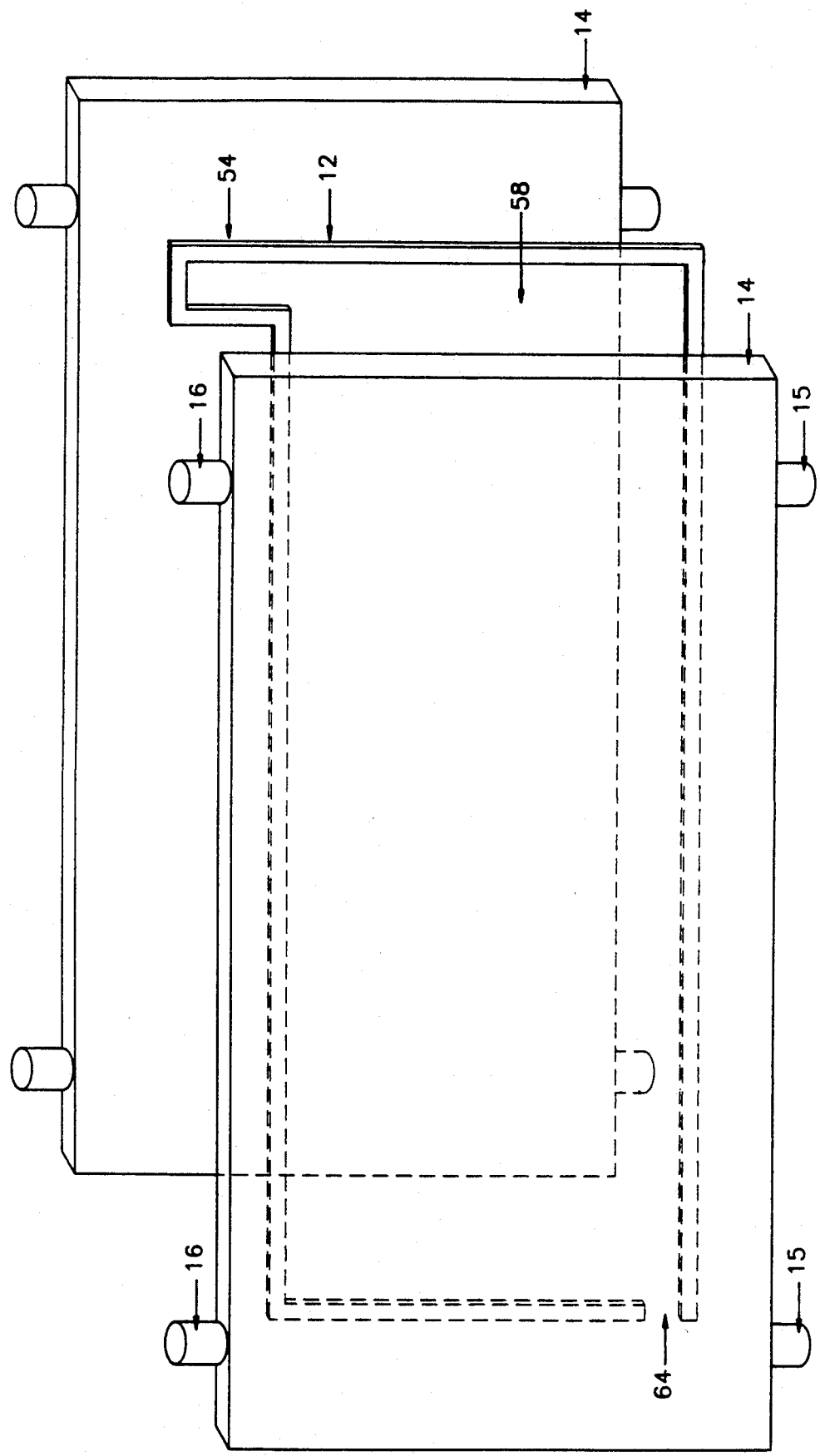
FIG. 6 is an exploded side elevation of a boundary frame between two platens creating a single cavity mold from the multiple mold assembly shown in FIG. 7.

Referring to FIG. 6, the apparatus comprises a removable boundary frame 12, each side of which is bounded by a pair of platens 14, which together define a mold 58. Although the mold shown in the drawings is rectangular, the platens having planar surfaces to produce planar sheets or panels, the mold size and configuration is a matter of choice depending on the desired size and configuration of the molded product. The platens 14 serve to define a portion of mold cavity 58, and also to transfer heat to and from the mold composition. Means for applying heat to the composition within the mold is provided, such as by electrical resistance heaters or channels within the platens for circulating heating fluid, or any other convenient means. Preferably, means are also provided for cooling the composition once at least partial cure has been accomplished. The preferred platens are internally characterized by a plurality of heat transfer channels (e.g., tubes or cut-outs) through which, via fluid entry ports 15, heating or cooling media, such as water or oil, as desired, can flow in order to uniformly heat and cool the platen surface which is in contact with the resinous composition. After the resinous composition has been sufficiently cured, the platens are cooled by a cooling media by introducing coolant through fluid entry ports 15. The mold assembly of this invention thereby provides direct heat, efficient, uniform heat transfer to and from the resinous composition.

Preferably, the fluid entry ports 15 are located in the bottom perimeter portion of the platen 14 to allow heating or cooling media to enter. These ports may optionally be connected by a manifold to aid in directing the heat transfer media into the ports 15. Fluid exit ports 16 are preferably in the top perimeter portion of the platen 14, wherein the thermal regulating media exits the platen 14. These ports 16 may also be connected to an exit manifold to carry off the media to a heating and cooling device not shown so that the fluids may be recycled if desired. Although in FIG. 6 only two inlet ports 15 and outlet ports 16 are shown, representing two zones of heat transfer, for molds above 8 feet long it is preferred to employ a minimum of four zones to increase uniformity of temperature on the platen face in contact with the molding composition. It is also preferred that each entry port 15 communicate with only one exit port 16, to allow more precise regulation of the temperature of the mold.

The platens and their internal heat transfer channels or tubes are preferably made of metal such as steel or aluminum. The heating fluid is preferably water adjusted to the desired temperature, preferably in excess of 150° F. Cooling is effected by injecting cooling fluids into entry port 15.

Figure 11:
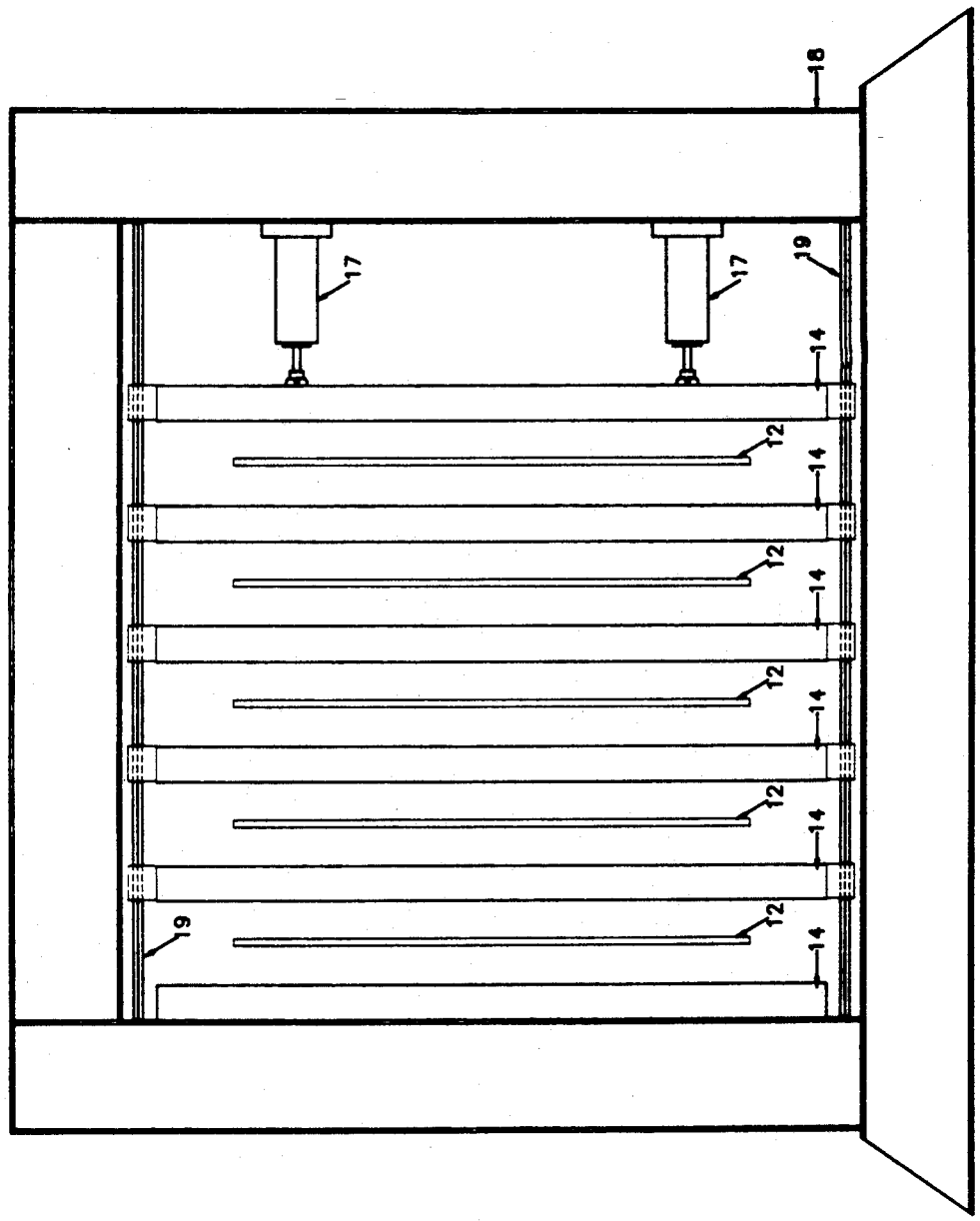
FIG. 11 is a front elevation view of the platen assembly of FIG. 7, showing the boundary frames between the platens.

As shown in FIG. 6 and FIG. 11, the mold assembly is preferably characterized by a plurality of removable boundary frames 12, defining the perimeter of molds 58, interleaved between platens 14, defining the sides of molds 58, to provide a series of molds 58, in order to more expeditiously produce the desired number of panels. The boundary frames may be of any convenient size, thickness, and shape. They can be non-linear to yield non-rectangular (e.g., oval) mold configurations. The boundary frames 12 are preferably made of a light material for ease of handling, such as aluminum or a plastic such as polyethylene, polypropylene, nylon, or any plastic with unaffected by the molding composition or the temperatures of the mold. Alternatively, the boundary frames may be integral with the platens, as by being affixed to one or more platens, or being formed as an extension or depression in one or more platens. The boundary frame 12 may also be made of a compressible material, such as pressurized tubing, to allow the platens to move as the molding composition cures and shrinks, thereby keeping the platens in contact with the molding composition during the entire curing process. Heat transfer is thereby facilitated, and conformity of the molded product with the mold is enhanced.

Figure 7:
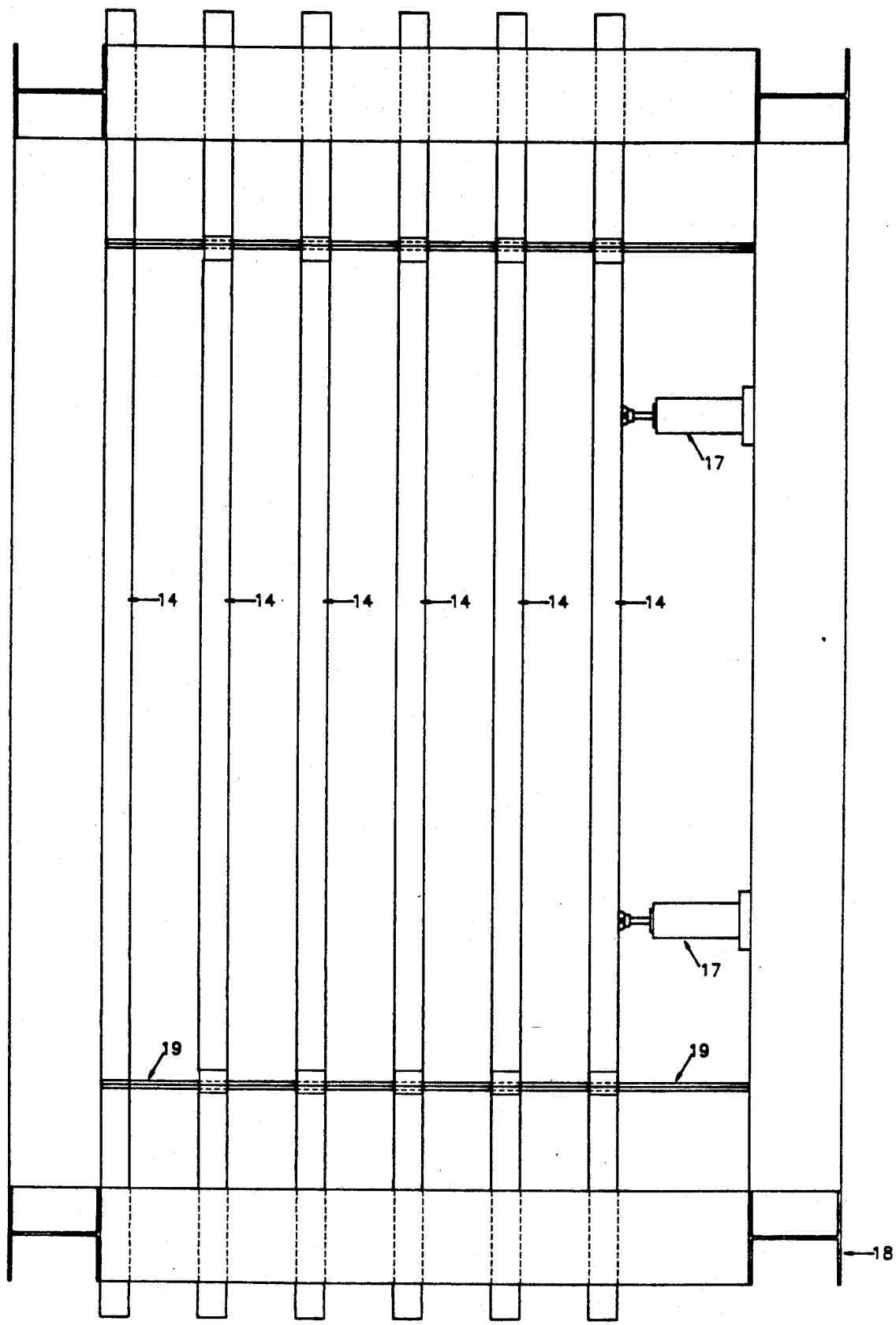
FIG. 7 is a top plan view of a five-cavity platen assembly.
Figure 8:
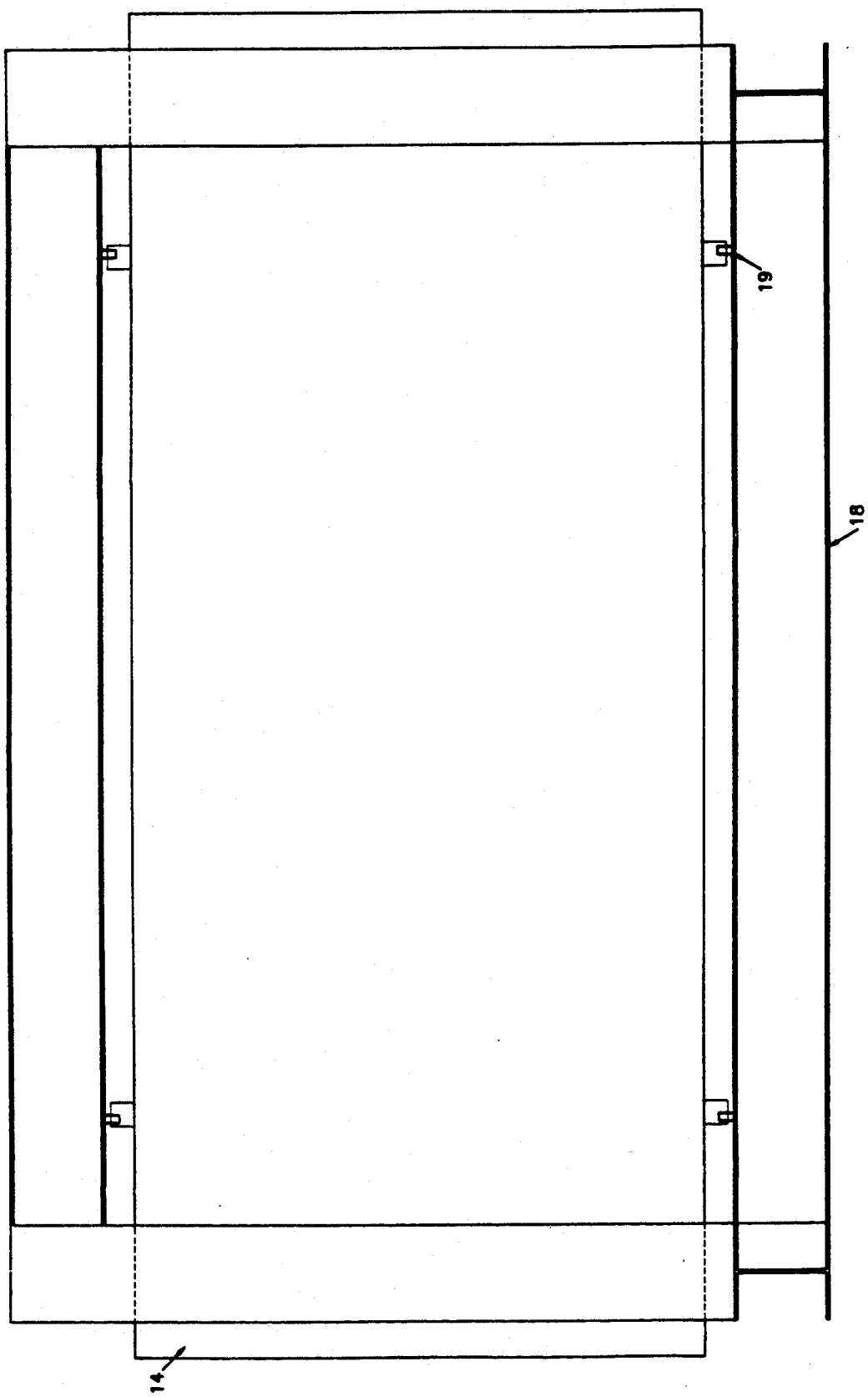
FIG. 8 is a side elevation view of the platen assembly of FIG. 7.
Figure 10:
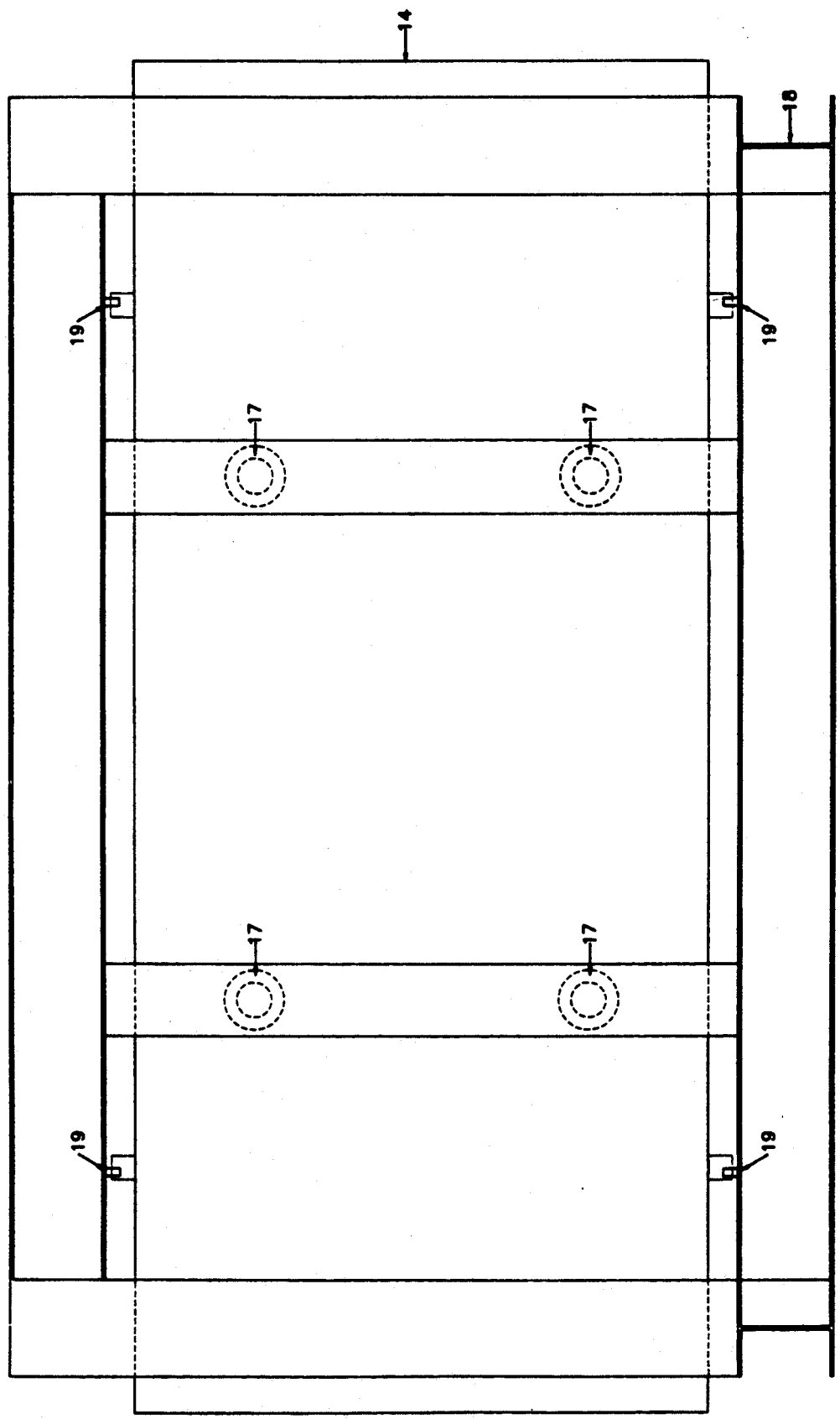
FIG. 10 is a side elevation view of the platen assembly of FIG. 7, showing in dotted lines pistons for moving the individual platens.

The mold assembly is supported as a unit on frame 18 with any convenient means, such as motors or air or hydraulic pistons 17, for moving the platens 14 and boundary frames 12 into abutting relationship with each other along tracks 19, to form molds 58 between boundary frames 12 and platens 14. Once the molds are filled and the reaction mixture is partially or fully cured to a solid state, the platens, now defining the opposite sides of the molded panels, are withdrawn along tracks 19 to facilitate removal of the boundary frames, now defining the perimeters of the molded products. Other views of the platen-frame assembly are shown in FIG. 7 and FIG. 10.

A mold release agent is preferably employed, to facilitate removal of the molded product form the mold. The mold release agent must be compatible with the molding composition, and stable at the temperature of the mold. Release agents such as polyvinyl alcohol, fluoroplastic, oils, soaps, waxes, and silicones may be employed. The preferred release agent is a highly polymeric synthetic resin dissolved or suspended in a volatile organic solvent, which leaves a slightly oily film upon evaporation of the solvent. The release agent may be applied by any convenient means, e.g., brush, roller, or spray.

Figure 14:
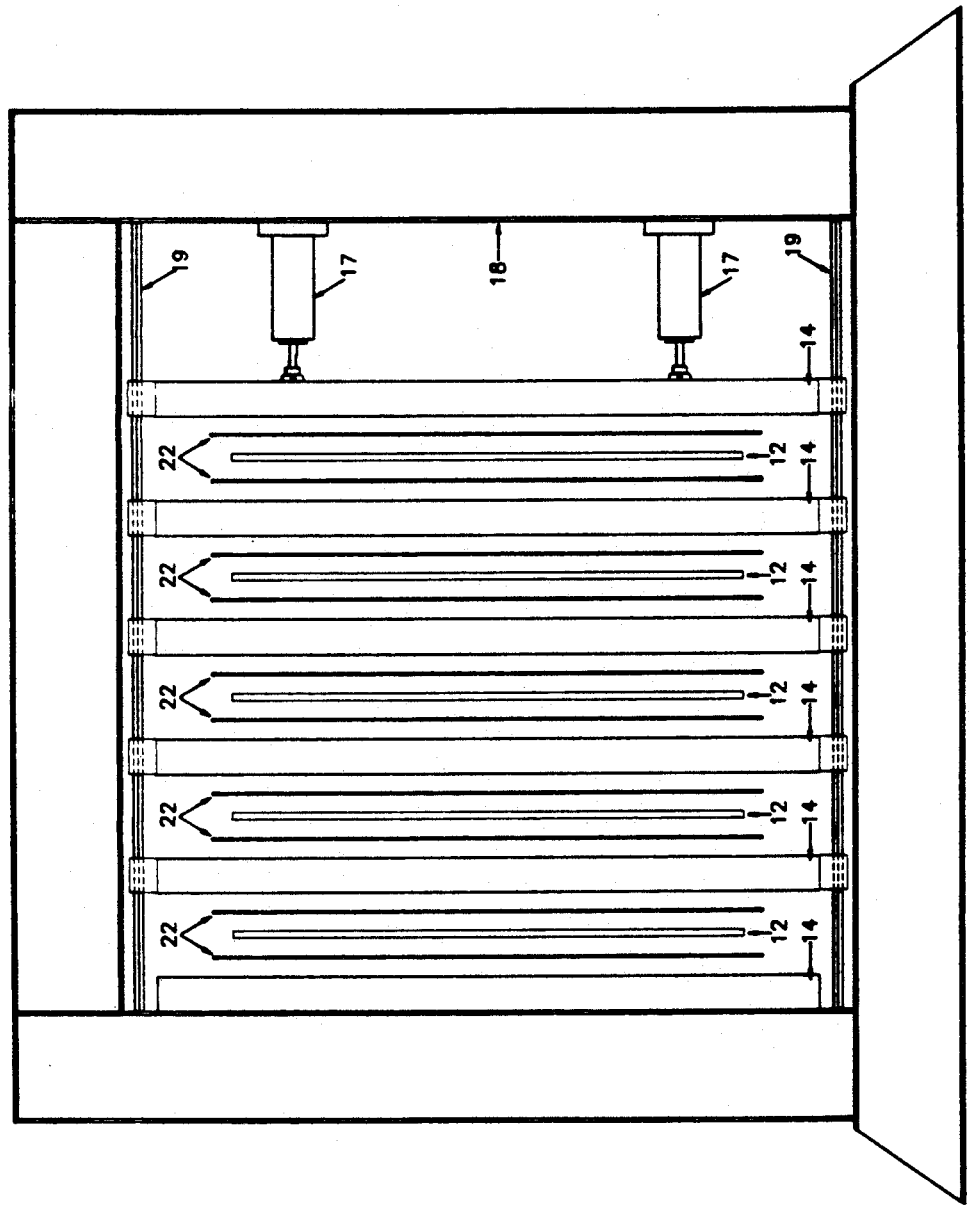
FIG. 14 is a front elevation view of the platen assembly of FIG. 7, showing the boundary frames and press plates between the platens.

The molded product can be provided with a variety of textures by employing press plates 22 between boundary frame 12 and platens 14, as illustrated in FIG. 14. Preferred are press plates of the type employed in manufacturing high pressure decorative plastic laminate, i.e., metal sheets. The press plates can be embossed to produce an embossed or textured finish on the molded product. Besides providing a variety of surfaces, employment of removable press plates facilitates cleaning the mold cavity, since when press plates are employed reaction product does not contact the platens.

Alternatively, press plates of other materials, such as plastic sheets or films, or metal foils, can be employed. Such a press plate comprises either rigid plastic sheets, or thin flexible plastic film. The material must be compatible with the reaction mixture, e.g., it must not be affected chemically by the mixture, and the temperatures during molding. Plastic film, such as 1 to 3 mil polyethylene, expands upon the application of heat during curing, creating an embossed slate-like surface finish to the molded product. A heat-shrinkable film, such as 50-125 gauge Cryovac MPD 2055 or D955 (W. R. Grace & Co., Duncan, S.C.), shrinks upon application of heat, yielding a smooth finish to the surface of the molded product. Besides the ability to produce a variety of surface finishes on the molded product, thin films facilitate cleanup, since they are disposable, and have release characteristics which eliminate the use of a separate release agent. If provided in the form of bags, with inlet and outlet openings corresponding to the inlet and outlet ports of the mold, cleanup is further facilitated since no molding composition will contact the platens or boundary frames.

Figure 13:
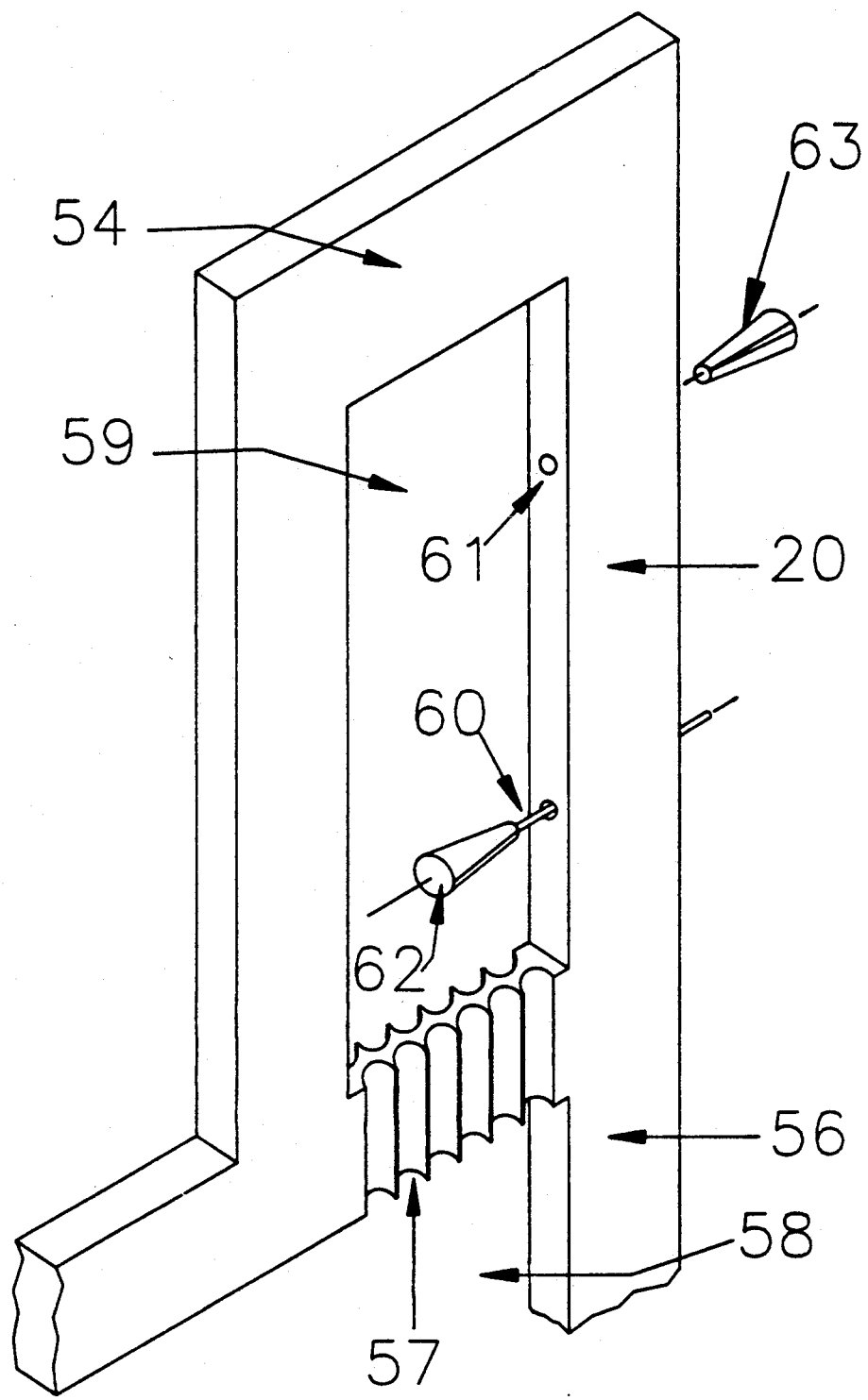
FIG. 13 is a perspective view of the riser projection of the mold shown in FIG. 6.

As shown in FIG. 13, the uppermost end of the top side member of each mold has an upwardly extending, relatively small rectangular riser projection 54 formed in it of which one upright side member 20 is an extension of the adjacent upright end member 56 of the boundary frame as a whole. A plurality of small outlet passages 57 are formed in the top side member of the boundary frame and provide for flow of material from within the cavity 58 defined by the boundary frame 12 into the cavity 59 defined by the riser projection. The side member 20 of the riser projection is pierced by at least one, but preferably two, vent holes 60 and 61 disposed one above the other. The issuance of material from a vent hole indicates that the corresponding mold cavity has been completely filled to the level of the vent hole in question. A clear riser pipe can be extended from the vent hole, through which exiting material can be viewed, to avoid spillage of material as it exits the vent hole. Through the riser can also be placed a thermocouple wire for monitoring the temperature of the composition during the curing cycle.

In practicing the invention, it is preferred that the respective mold cavities be filled as described hereinafter until material issues from the lower vent hole 60 of each riser 54. As material reaches each lower vent, both vents of the corresponding riser structure are plugged by plugs 62 and 63 to prevent further flow into the corresponding cavity. Filling is then stopped, and all vents are plugged. Where the mold assembly has more than one cavity, the next cavity is then similarly filled with the resinous composition.

Figure 12:
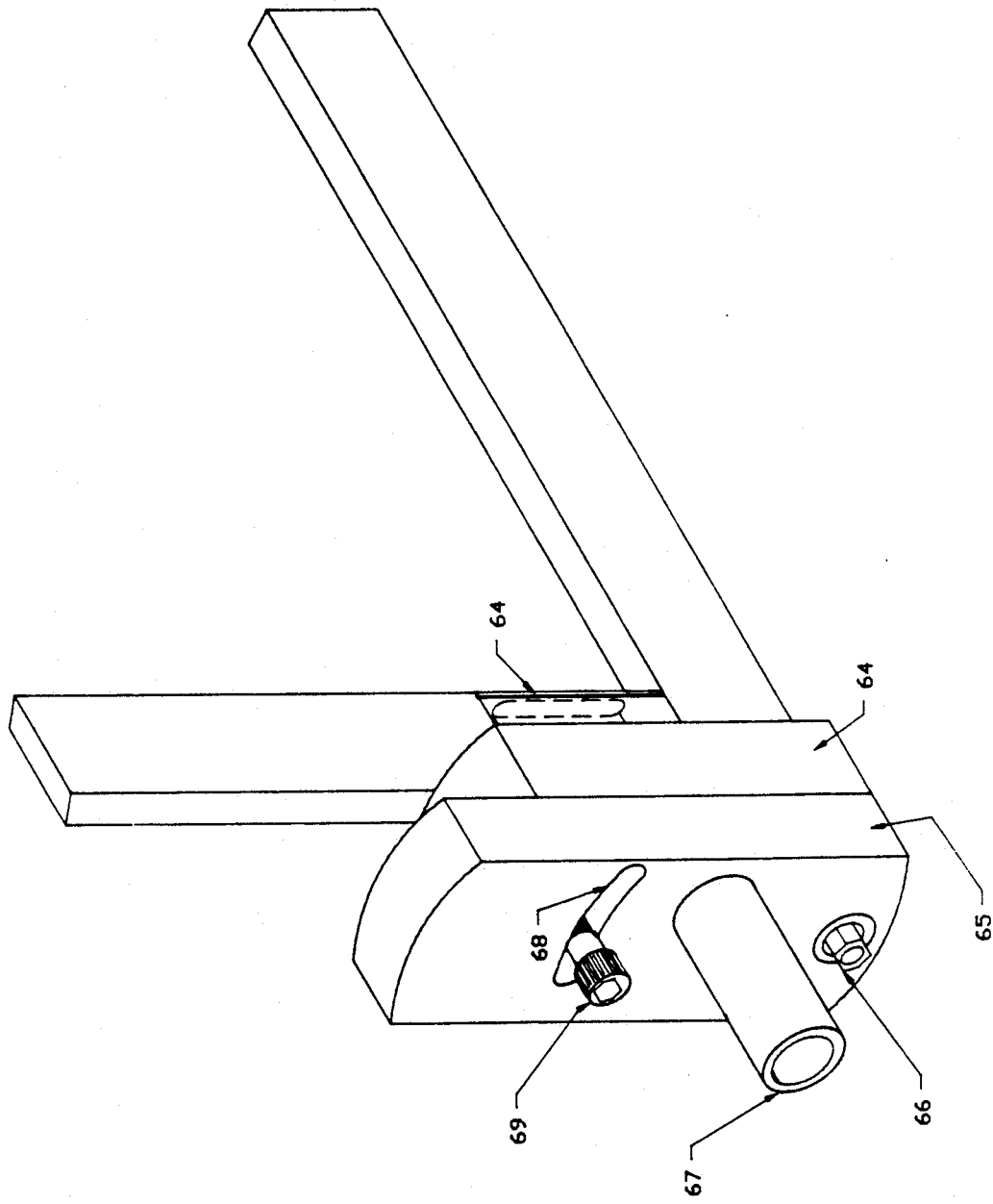
FIG. 12 is a perspective view of the inlet valve assembly of the mold assembly.

A valve assembly 8 is provided to control the flow of reaction mixture into the molds. As can best be seen in FIG. 12, the bottom end of the lower most member of each boundary frame 12 has an inlet port block 64, which port block has one or more inlet ports to allow the flow of the reaction mixture through the boundary frame and into the mold cavity defined by it and the platens. Valve block 65 is connected to port block 64 through pin 66, about which valve block 65 can pivot. Valve block 65 has a tube 67 defining an opening in communication with the inlet port(s) of port block 64 when valve block 65 is pivoted to a first position, and which opening is not in communication with the inlet port(s) of port block 64 when valve block 65 is pivoted to a second position. Valve block 65 has a slot 68 through which stop 69 projects, to define said first and second pivot positions. Other valve means are obvious. In addition, conventional valve means may be employed. An advantage of the valve means of this invention is its simplicity, in that it has few moving parts and is easily disassembled for cleaning and repair.

The thermosettable compositions of this invention may be fully or partially cured in the mold described herein. Preferably, the composition is brought to approximately 70% to 90% of its completely cured state in the mold, which generally occurs approximately 1 to 15 minutes after the composition reaches its maximum temperature, or peak exotherm. The peak exotherm can be measured by a thermocouple wire inserted into the reaction mixture, and can be determined for any reaction mixture, catalyst composition, and heat transfer fluid temperature. For example, one convenient laboratory method comprises monitoring the temperature profile over time of a sample quantity of the molding composition placed in a water bath of constant temperature.

At a cure of from about 70% to about 90%, the composition is semi-solid, or rubbery, with sufficient dimensional stability to allow handling. Removal of the composition from the mold prior to complete cure allows the mold to be used for production of another panel, while the partially cured material may be fully cured through other means described below.

When the molding composition is introduced into the mold, the mold temperature should be below the activation temperature of the curing agent. During curing, a heat transfer fluid is circulated through the platens to maintain a mold temperature between about 100° F. and 350° F., and preferably between about 150° F. and 220° F. The fluid serves to transfer heat to the molding composition at the beginning of the curing cycle. Because the polymerization reaction is exothermic, the temperature of the molding composition may eventually exceed the temperature of the heat transfer fluid, which then functions as a coolant to moderate the rate of reaction. For molded products greater than about 1 inch in thickness, lower temperatures are desirable to prevent thermal cracking.

Within about 1 to about 15 minutes after the peak exotherm is reached (after about 20 minutes to about 40 minutes in the mold), cooling water at between about 40° F. and about 100° F., and preferably between about 60° F. and 80° F., is circulated through the molds to cool the molded composition to between about 100° F. and about 200° F., so that it may be removed from the molds in at least a semi-solid state. With the preferred composition of this invention, the partially cured product exhibits a Barcol hardness of about 15 to 20 if removed from the mold one minute after the peak exotherm is reached. At such a state of cure, the product resembles hard rubber.

The molding composition can be fully cured and cooled in mold 6. However it is preferred to remove the partially cured product from mold 6 prior to full cure. Subsequent to removal from the press, the composition, if partially cured, is transferred to a heated oven maintained at between about 100° F. and about 300° F., and preferably between about 150° F. and about 200° F., and so maintained for approximately 15 to 30 hours, and preferably about 24 hours, to complete the curing process.

Figure 9:
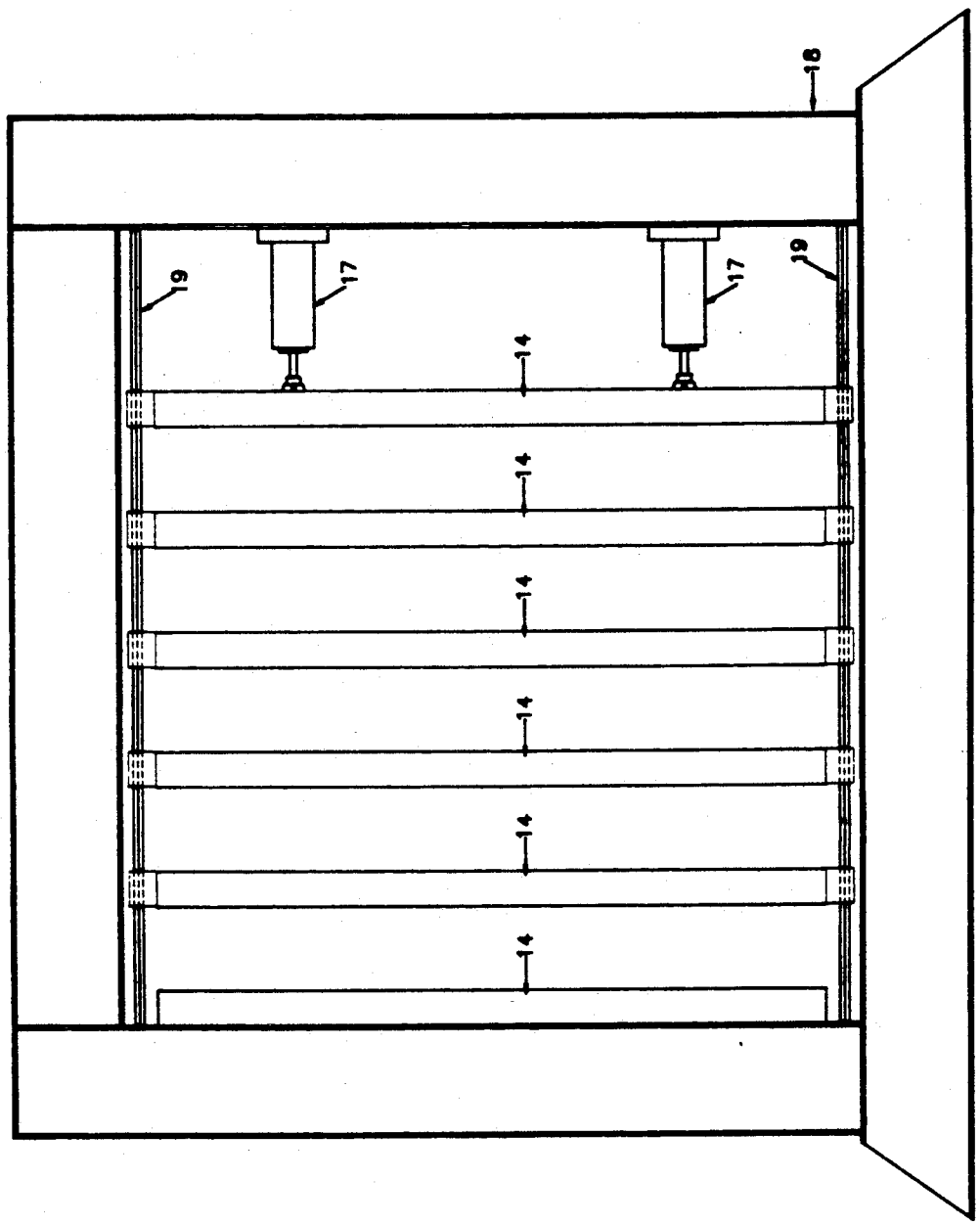
FIG. 9 is a front elevation view of the platen assembly of FIG. 7.

Alternatively, in lieu of use of a heated oven, after removal from the mold 6 the partially cured composition may be transferred to a curing press and maintained at between about 100° F. and about 300° F., and preferably between about 150° F. and about 200° F., for between about 10 minutes to about 1 hour for final curing. The curing press is similar in design to the platen assembly shown in FIG. 9, comprising heatable opposed platens. It is preferred that curing in mold 6 be sufficiently complete that boundary frames are not required for subsequent curing. The fully cured molded composition upon removal from the oven or curing press may not be completely rigid, and may be relatively pliable at the temperatures of the oven or curing press, if the composition has not been cooled to below about 100° F. It is preferred that the molded composition be transferred to a cooling press of a design similar to the platen assembly shown in FIG. 9 and the curing press, except that means for heating the composition are not required. The cooling press should be maintained at between 40° F. and 100° F. for a time sufficient to cool the composition to a rigid state.

Since the cured product as it is introduced to the oven, curing press, or cooling press may not be completely rigid, any texture and configuration of the support means in the oven or presses (e.g., the press platens) may be transferred to the panels. If a completely smooth finish is desired, the support means should be completely smooth. Alternatively the support means may bear a texture or design. In addition, because of its lack of complete rigidity if only partially cured in mold 6, the molded product can be further molded into a variety of shapes in the curing press and/or cooling press, if desired, e.g., the shape of a countertop with an integral backsplash and/or integral apron.

Use of separate devices for molding, final curing, and cooling is preferred to performing full curing and cooling in mold 6. In the former case, each device can be kept at or near its optimal temperature, without heating and cooling cycles. In addition, the curing press or oven and the cooling press are less complex, and less costly, than the molds 6, and allow molds 6 to be available a greater portion of the time.

The process and apparatus of this invention may further be employed in the production of articles simulating granite. In this alternative embodiment, the cured synthetic resinous material (chips) which may be obtained from the process of this invention, is ground and then admixed with the raw virgin components including curing agent in mixing tank 1. It is preferred to mix all components, other than the chips, in a high shear mixer as noted above, and to then admix the chips using a low shear impeller, such as a propeller blade, to avoid fracturing the chips.

EXAMPLES

EXAMPLE 1

A marble-like composition was prepared. The following constituents were admixed in a mixing tank, employing a Morehouse Cowles dissolver model J25-2 (see, U.S. Pat. No. 3,135,499) equipped with a dispersing impeller to create high shear mixing:

|  | PARTS BY WT. |
| --- | --- |
| Polyester A | 16.48 |
| Styrene | 7.06 |
| Methyl methacrylate | 9.36 |
| THIXOGEL PL-S | 0.35 |
| Alumina trihydrate | 66.55 |
| $TiO_2$ (70% in polyester) | 0.20 |

Polyester A is a condensation product of neopentyl glycol, isophthalic acid and maleic anhydride. A combination of polyester A and styrene is available commonly as a gel coat resin for surface applications. The methyl methacrylate in this and in all other examples contained 100 ppm methyl ethyl hydroquinone inhibitor. The colorant, titanium dioxide, was in a monomer-free, low viscosity unsaturated polyester, in a 70% by weight concentration.

Alumina trihydrate (ATH) was #308 from Sumitomo Chemical Co., prepared by precipitation, to yield generally round particles of about 8-10 micron mean particle diameter, with 0.1% greater than 44 microns, and 25% less than 4 microns.

Once thoroughly mixed to reach a temperature of about 100° F. (approx. ½ hour), the mixture was cooled at room temperature to about 80° F., and 1% (based on reactive resin-polyester, styrene, MMA) of a 1:3 blend by weight of Trigonox 141 and Trigonox 29-B75 was admixed. The blend was pumped through a bag filter having a screen size of about 150 microns, to the top of a vacuum tank at a vacuum of approx. 28 inches mercury, via a Moyno pump at the rate of approximately 7.5 gallons/minute. Upon entering the vacuum tank, the mixture exploded, entrained air was removed, and the de-aerated mixture fell to the bottom of the tank. The de-aerated mixture was transferred by a piston pump from the tank through a bag filter having a screen size of 50 microns to a mold as shown in FIG. 2, with a rectangular cavity 3 feet by 8 feet by ½ inch. The platens had four zoned heat transfer sections, each with individual fluid inlet and exit ports. The platens were continuously heated with 195° F. water. The temperature of the composition was monitored via a thermocouple wire inserted into the composition through the exit port of the mold. The temperature of the molding mixture reached its peak exotherm temperature of about 250° F. in approximately 20 minutes, and then began to decrease. Approximately three minutes after the composition reached its peak exotherm, cooling water at about 75° F. was substituted for heated water, and the panels were cooled to about 100° F. The partially cured panels were removed from the mold, and yielded a Barcol hardness of about 30. The panels were then transferred to an oven, placed in a horizontal position, and maintained at approximately 160° F. for approximately 24 hours for final curing. The panels were then removed from the oven and allowed to cool to room temperature. The surface was wet sanded to obtain a satin finish. The cured product appeared uniformly white, had consistent dimensions corresponding to the mold cavity, and exhibited a uniform Barcol hardness value of approximately 60. The molded sheet had smoke and flame indices, measured by the ASTM E-84-87 test, of less than about 25. Other physical properties (such as stain resistance, steam resistance, radiant heat resistance, impact resistance, resistance to deflection under heat and load, and breaking strength) were consistent with commercial requirements.

EXAMPLE 2

A granite-like composition was prepared. Chips were prepared by grinding a sample of the marble product obtained in Example 1. The chips were of a particle size distribution of between about 150 microns and 1800 microns, with a mean particle size of about 800 microns. The matrix was prepared from the following formulation, in the same manner as in Example 1 above:

|  | PARTS BY WT. |
| --- | --- |
| Polyester A | 16.51 |
| Styrene | 7.07 |
| Methyl methacrylate | 9.38 |
| THIXOGEL PL-S | 0.35 |
| Alumina trihydrate | 66.69 |

Note that the above formulation is the same as in Example 1, except that no colorant was used, in an effort to obtain a generally color-free matrix for the synthetic granite product. The above matrix constituents were dispersed using a high shear blade in a Cowles disperser until a temperature of about 100° F. was reached (approx. ½ hour). A low shear propeller blade was substituted for the high shear disperser blade in the mixing tank, and to the matrix mixture was added about 12% by weight (based on the weight of the resulting mixture) of chips. The resulting mixture was then mixed at low shear until a thoroughly mixed generally homogeneous blend was obtained (approximately one-half hour).

The mixture was cooled at room temperature to about 80° F., and 1% (based on reactive resin-polyester, styrene, methyl methacrylate; excluding resin in the chips) of a 1:3 blend by weight of Trigonox 141 and Trigonox 29-B75 was admixed.

The mixture was then transferred to the top of a vacuum tank at a vacuum of 28 inches of mercury, via a double diaphragm pump at the rate of approximately 7.5 gallons/minute. The pressure in the vacuum tank was increased to atmospheric pressure and the de-aerated mixture was pumped, by a double diaghram pump, from the bottom of the vacuum tank into a mold of the type described herein. No in-line filters or static mixers were employed.

The mixture was cured in the mold and in an oven, in the same manner as described in Example 1. The resulting molded product comprised a generally white semi-translucent matrix with visually distinct white particles dispersed uniformly throughout. The Barcol hardness values and the smoke and flame indices for the product of Example 2 were the same as in Example 1. Impact resistance was approximately one-half that of the product of Example 1, and breaking strength was about 65% that of the product of Example 1. Other physical properties were approximately the same as in Example 1.

EXAMPLE 3

A second synthetic granite composition was prepared, using chips having a different composition than the matrix. A chip composition was prepared and cured, ground into chips, and mixed with a matrix composition, which was thereafter cured.

The chip composition was prepared by admixing in a mixing tank, employing a Cowles disperer with a high shear impeller, the following composition:

|  | PARTS BY WT. |
| --- | --- |
| Polyester B | 14.97 |
| Styrene | 7.48 |
| Methyl methacrylate | 7.48 |
| Alumina trihydrate | 69.86 |
| Carbon black | 0.21 |

Polyester B is a condensation product of ethylene glycol, isophthalic acid, and maleic anhydride. Polyester B is commonly used in applications in which chemical resistance is desired. The colorant, carbon black, was in a monomer-free, low viscosity unsaturated polyester, in a 20% by weight concentration. The ATH was Solem SB 336, produced by grinding such that about 5% of particles were greater than 44 microns and 25% of particles were smaller than 10 microns, with a mean particle size of between about 14 and about 17 microns.

The composition was prepared, catalyzed and cured in the same manner as the composition of Example 1. The cured composition was ground into chips in the same manner and of the same size as in Example 2.

A matrix composition was prepared in the same manner as set forth in Example 1, employing the following composition:

|  | PARTS BY WT. |
| --- | --- |
| Polyester A | 17.31 |
| Styrene | 7.42 |
| Methyl methacrylate | 13.82 |
| THIXOGEL PL-S | 0.57 |
| Alumina trihydrate | 60.88 |

Polyester A is the same polyester as in Example 1. The ATH was the same as in Example 1.

The synthetic granite product was prepared in the same manner as set forth in Example 2, using the chips of this example and the matrix composition of this example. The weight ratio of chips to matrix on the chips was the same as in Example 2, i.e., 12%. The same curing agent was employed, in the same manner, as in Example 2. The molded product comprised a generally white semi-translucent matrix with visually distinct black particles dispersed uniformly throughout. The product also had the same smoke and flame indices, and Barcol hardness, of the product of Example 2. The breaking strength was about 75% that of the product of Example 1, and the impact resistance was about 55% that of the product of Example 1. The other physical properties were approximately the same as those of the product of Example 1.

EXAMPLE 4

A third synthetic granite composition was prepared, in exactly the same manner as set forth in Example 3, with the same proportions of the same constituents, except that about 40% of the methyl methacryate was withheld from the matrix composition and used to wet the chips prior to mixing them with the matrix.

The total amount of methyl methacrylate in the resulting granite molding composition was 13.82% based on the weight of the resulting composition excluding the weight of the chips. In other words, the proportion of methyl methacrylate used in the synthetic granite composition of this example was the same as in Example 3.

The matrix composition, after substracting the methyl methacrylate used to wet the chips, comprised the following:

|  | PARTS BY WT. |
|---|---|
| Polyester A | 18.36 |
| Styrene | 7.87 |
| Methyl methacrylate | 8.58 |
| THIXOGEL PL-S | 0.60 |
| Alumina trihydrate | 64.59 |

The product appeared substantially identical to that of Example 3. The product had the same smoke and flame indices, and Barcol hardness, of the product of Example 3. The strength of the product was about 95% of that of the product of Example 1, and the impact resistance was about 80% of that of the product of Example 1. The other physical properties of the product approximated those of the product of Example 3.

EXAMPLE 5

A fourth granite-like composition was prepared, this time using chips of substantially larger size than in the two preceeding examples. The chips were prepared by grinding a sample of the marble product obtained in Example 1. The chips were of particle size distribution between about 500 microns and 2000 microns, with a mean particle size of about 1500 microns. The matrix was prepared from the same matrix formulation and in the same manner as in Example 3.

The chips were first coated with methyl methacrylate in the same amount and manner as in Example 4, and then combined with the matrix in the same manner as in Example 2, with the same curing agent as in Example 2, and was thereafter processed in the manner set forth in Example 2. The chips comprised 12% by weight of the matrix composition, including in the latter the methyl methacrylate on the chips (i.e., the same proportion as in Examples 2 and 3). The resulting molded product comprised a generally white semi-translucent matrix with large, visually distinct white particles dispersed uniformly throughout. The Barcol hardness values and the smoke and flame indices for the product were the same as for the product in Example 1. The strength of the product was about 65% of the product of Example 1, and the impact resistance was about 50% of the product of Example 1. Other physical properties were about the same as the product of Example 1.

EXAMPLE 6

A fifth synthetic granite composition was prepared, using a much smaller proportion of chips, and slightly smaller chips, than in the preceeding example. The chips were ground from several marble products prepared as set forth in Example 1, except that in place of titanium dioxide each marble product had been prepared with a different colorant employed at approximately the same concentration (0.2% by weight of the matrix(. The colorants were liquid colorants from PDI of Edison, N.J., comprising pigment at from about 15% to about 70% by weight in a monomer-free, low viscosity unsaturated polyester. The chips were prepared by grinding several samples of such marble products to yield a particle size distribution of between about 500 microns and 1800 microns, with a mean with a mean particle size of about 1150 microns. The matrix was prepared from the same matrix formulation set forth in Example 2, in the manner set forth in Example 2.

The chips were combined with the matrix in the manner set forth in Example 2 (i.e., without pre-wetting the chips with methyl methacrylate) with the same curing agent as in Example 2. Only 2½% by weight of chips, based on the weight of the resulting mixture, was used. The resulting mixture was thereafter processed in the manner set forth in Example 2. The resulting molded product comprised a generally off-white matrix with small, visually distinct particles of various colors dispersed uniformly throughout. The Barcol hardness values and the smoke and flame indices for the product were the same as for the product in Example 1. The strength of the product was about 85% of the product of Example 1, and the impact resistance was about 60% of the product of Example 1. The other physical properties were about the same as the product of Example 5.

EXAMPLE 7

A sixth simulated granite product was prepared, in exactly the same manner as in Example 6, except that about half of the methyl methacrylate from the matrix composition was withheld from that composition and used to wet the chips before they were added to the matrix composition. The chips were mixed with the methyl methacrylate to thoroughly wet them, and then the wet chips were added to the balance of the matrix composition. The resulting molded product appeared identical to the product of Example 6, and had the same Barcol hardness, smoke and flame indices as the product of Example 6. The physical properties of the product were the same as the product of Example 6.

EXAMPLE 8

A second synthetic marble composition was prepared, employing styrene instead of methyl methacrylate. The composition comprised the following:

|  | PARTS BY WT. |
|---|---|
| Polyester A | 16.48 |
| Styrene | 16.42 |
| THIXOGEL PL-S | 0.35 |
| Alumina trihydrate | 66.55 |
| TiO$_2$ (70% in polyester) | 0.20 |

Polyester A is the same polyester as in Example 1.

The composition was processed, catalyzed, and cured in the same manner as in Example 1. The viscosity of the composition was substantially higher than in the above compositions employing methyl methacrylate. The Barcol hardness was 55. The smoke index was about 30 and the flame index was about 25. The physical properties approximated the product of Example 1.

EXAMPLE 9

A third synthetic marble product was prepared, substituting styrene for methyl methacrylate. The composition comprised the following:

|  | PARTS BY WT. |
| --- | --- |
| Polyester A | 28.29 |
| Styrene | 15.23 |
| Alumina trihydrate | 56.31 |
| TiO$_2$ (70% in polyester) | 0.17 |

Polyester A is the same polyester used in Example 1.

The composition was processed, catalyzed, and cured in the same manner as in Example 1. The Barcol hardness was about 55–60. The smoke index was 110 and the flame spread index was 41. The physical properties approximated the product of Example 1.

EXAMPLE 10

A fourth synthetic marble composition was prepared, employing styrene instead of methyl methacrylate and with a different polyester resin. The composition comprised the following:

|  | PARTS BY WT. |
| --- | --- |
| Polyester C | 29.35 |
| Styrene | 15.80 |
| Alumina trihydrate | 54.64 |
| TiO$_2$ (70% in polyester) | 0.20 |

Polyester C is a condensation product of ethylene glycol, orthophthalic acid, and maleic anhydride.

The composition was processed, catalyzed, and cured in the same manner as in Example 1. The Barcol hardness was 50–55. The smoke index was 240 and the flame index was 47. The strength and impact resistance of the product approximated that of the product of Example 1. The product displayed poor heat distortion resistance.

EXAMPLE 11

A granite product was made using the matrix of Example 3, with chips between one-half inch and one inch in size. The chips employed were made from the product of Examples 1 and 3. The chips were mixed with the matrix, without first wetting the chips with methyl methacrylate, and with the same curing agent in the same proportion as in Example 2. The chips comprised about 12% by weight of the resulting mixture. The resulting mixture was poured into a small pan about 4 inches deep, 4 inches wide, and 8 inches long. The mixture was cured in an oven at 100° F. for about three days. The cured product was cut with a bandsaw into slices approximated ½ inch thick, and polished. The product had a generally white semi-translucent matrix with large chips dispersed throughout, small chips clearly visible in the large chips. The physical properties of the product were not tested, but are believed to be consistent with the properties of the product of Example 2.

EXAMPLE 12

A marble composition was made using a high loading of large alumina trihydrate particles. The mean size of the ATH particles was 70 microns, with 54% being above 74 microns and 90% being above 44 microns. The molding composition was as follows:

|  | PARTS BY WT. |
| --- | --- |
| Polyester A | 7.24 |
| Styrene | 3.10 |
| Methyl methacrylate | 4.11 |
| THIXOGEL PL-S | 0.35 |
| Alumina trihydrate | 85.00 |
| TiO$_2$ (70% in polyester) | 0.20 |

The product was made in the same manner as the product of Example 1, with the same proportion of the same curing agent as in Example 1. The resulting molded product was chalky, with poor stain resistance, strength, and impact resistance.

EXAMPLE 13

The synthetic granite composition of this example was prepared in exactly the same manner as set forth in Example 6, using the same chips and other constituents, in the same amounts, as in Example 6, except that instead of the curing agent set forth in Example 6 a 1:3 weight ratio combination of Percadox 16 and Trigonox 29-B75 was used. Percadox 16 is bis(4-t-butyl cyclohexyl) peroxy dicarbonate, available from Akzo Chemie. The amount of curing agent used was 1% based on the weight of the resin (other than that in the chips).

All properties of the composition of this example were substantially the same as the product of Example 6.

EXAMPLE 14

The synthetic granite composition of this example is prepared in exactly the same manner as set forth in Example 6, except that instead of the catalyst set forth in Example 6 Trigonox KSM is used. Trigonox KSM comprises 50% by weight t-butyl peroctoate, 25% by weight 1,1, di-t-butyl-3,5,5 trimethyl cyclohexane, and 25% by weight dibutyl phthalate. The amount of curing agent is 1% based on the weight of the resin, excluding chips. All properties of the composition of this example are substantially the same as the product of Example 6.

EXAMPLE 15

The synthetic granite composition of this example is prepared in exactly the same manner as set forth in Example 6, except that instead of the catalyst set forth in Example 6 a 1:3 blend of Trigonox 141 and Trigonox 21-OP50 is used. Trigonox 21-OP50 comprises 50% by weight t-butyl peroxy 2 ethyl hexanoate or t-butyl peroctoate, and 50% by weight dioctyl phthalate. The amount of curing agent is 1% based on the weight of the resin, excluding chips. All properties of the composition of this example are substantially the same as the product of Example 6.

EXAMPLE 16

Various methods of post-mold curing were tested. Several partially cured panels from Example 1 were placed in an oven after removal from the mold, for various periods of time at various temperatures, instead of the 24 hours at 160° F. of Example 1. Several other such partially cured panels from Example 1 were placed in a curing press for various periods of time, at various temperatures. Each of the samples was then cooled to room temperature, and subject to a heat distortion test. The heat distortion test comprised placing a 1"×24"×⅛" sample on a pair of knife edges 16" apart, placing a 10 lb weight on the center of the sample, and placing the weighted sample in an oven at 150° F. for 24 minutes. The results were as follows:

| | |
|---|---|
| Oven, 160° F. 6 hours | 11/32" |
| Oven, 160° F., 24 hours | 5/32" |
| Oven, 200° F., 2 hours | 14/32" |
| Oven, 200° F., 6 hours | 13/32" |
| Oven, 200° F., 24 hours | 4/32" |
| Oven, 250° F., 2 hours | 5/32" |
| Oven, 250° F., 6 hours | 4/32" |
| Oven, 250° F., 24 hours | 4/32" |
| Press, 200° F., 5 minutes | 19/32" |
| Press, 200° F., 15 minutes | 5/32" |
| Press, 250° F., 5 minutes | 8/32" |
| Press, 250° F., 15 minutes | 6/32" |
| Press, 300° F., 5 minutes | 3/32" |
| Press, 300° F., 15 minutes | 5/32" |

Each of the above samples had the same general appearance, except that the products increased in yellowing with increasing temperature. The other physical characteristics, Barcol hardness, and smoke and flame spread indices of each of the samples was the same as the product of Example 1.

EXAMPLE 17

A test was conducted to determine the effect of filler particle size distribution on the ability to load the molding composition with filler. Two test batches were prepared of a polyester-styrene-methyl methacrylate resin, one with Alcoa C333 ATH, and the other with Acoa Hydral 710 ATH. Alcoa C333 ATH has a median particle size of 8 microns, with 95% of particles less than 30 microns, 83% less than 20 microns, 58% less than 10 microns, and 35% less than 5 microns. Hydral 710 ATH has a median particle size of 1 micron, with 95% less than 3 microns, 90% less than 2 microns, 20% less than 0.6 microns, and 10% less than 0.5 microns. The Alcoa C333 ATH was added to a test batch of resin. The Hydral was added to a second test batch of resin. A blend of 80% by weight C333 and 20% by weight Hydral was added to a third test batch of resin. All three batches were made with the same wight precent of ATH. The blend of C333 and Hydral had a lower viscosity than either of the first two batches, indicating that a wider particle size distribution allows a greater proportion of ATH to be added to the resin.

As is readily apparent from the above description additional advantages and modifications will readily occur to one skilled in the art. The invention in its broader aspects is therefore not limited to the specific examples shown and described. Accordingly, departures may be made from the details shown in the examples without departing from the spirit or scope of the disclosed general inventive concept.

We claim:

1. A thermosettable molding composition comprising an intimately mixed and substantially airless mixture of
   A. a first portion comprising:
      between about 10 to about 25 parts by weight of a polyester comprising the reaction product of (i) at least one acyclic ethylenically unsaturated dicarboxylic acid or anhydride thereof (ii) at least one aromatic dicarboxylic acid and (iii) a $C_2$-$C_8$ glycol;
      between about 10 and about 25 parts by total weight of at least two ethylenically unsaturated monomers;
      between about 50 and about 80 parts by weight of deagglomerated particles selected from the group consisting of alumina trihydrate, borax, hydrated magnesium, calcium carbonate and calcium sulfate dihydrate, said particles having a mean size of between about 5 microns and about 20 microns, and having a maximum size of about 50 microns and a minimum size of about 0.1 micron, said particles being substantially coated by said monomer and said polyester; and
   B. a second portion comprising a first free radical producing curing agent which is initiated at a temperature of between about 100° F. and about 200° F. and a second free-radical producing curing agent which is initiated at a temperature of between about 150° F. and 300° F.

2. The composition of claim 1 wherein said aromatic dicarboxylic acid is selected from the group consisting of phthalic acid and isophthalic acid.

3. The composition of claim 1 wherein said acyclic ethylenically unsaturated dicarboxylic acid is selected from the group consisting of maleic acid, fumaric acid, linoleic acid, linolenic acid, itaconic acid, oleic acid, and anhydrides thereof.

4. The composition of claim 1 wherein said glycol is selected from the group consisting of neopentyl glycol, 1,4-butanediol, 1,6-hexanediol, 1,4-cyclohexanediol, ethylene glycol, propylene glycol, dipropylene glycol, diethylene glycol, butylene trimethylene glycol, and triethylene glycol.

5. The composition of claim 1 wherein at least one of said ethylenically unsaturated monomers is selected from the group consisting of alkyl acrylates, alkyl methacrylates, hydroxyalkyl acrylates, hydroxyalkyl methacrylates, N,N-dialkylaminoalkyl acrylates, N,N-dialkylaminoalkyl methacrylates, styrene, vinyl acetate, acrylonitrile, methacrylonitrile, maleic acid, maleic anhydride, maleic acid esters, acryl amide, methacrylamide, itaconic acid, itaconic anhydride, itaconic acid ester, alkylene diacrylate, alkylene dimethacrylates, N-hydroxymethyl-acrylamide, diallyl phthalate, divinylbenzene, vinyl toluene, divinyltoluene, trimethylolpropane triacrylate, trimethylolpropane trimethacrylate, pentaerythritol tetraacrylate, pentaerythritol tetramethacrylate, triallyl citrate, and triallyl cyanurate and mixtures thereof.

6. The composition of claim 5 wherein said alkyl acrylate is selected from the group consisting of methyl acrylate, ethyl acrylate, n-propyl acrylate, i-propyl acrylate, n-butyl acrylate, 2-butyl acrylate, i-butyl acrylate, t-butyl acrylate, 2-ethylhexyl acrylate, and cyclohexyl acrylate.

7. The composition of claim 5 wherein said ethylenically unsaturated monomers are a mixture of styrene and methyl methacrylate.

8. The composition of claim 7 wherein said styrene and said methyl methacrylate are in a weight ratio of between about 2:1 and about 1:4.

9. The composition of claim 1 wherein the particle size distribution is such that smaller particles substantially fill the interstices between larger particles.

10. The composition of claim 1 wherein the cured product has a Barcol hardness of at least about 55.

11. The composition of claim 1 wherein said first curing agent is 2,5-dimethyl-2,5-bis(2-ethyl hexanoylperoxy) hexane and said second curing agent is 1,1-di-t-butyl peroxy-3,3,5-trimethylcyclohexane.

12. The composition of claim 11 wherein the weight ratio of the first curing agent and the second curing agent is between about 2:1 to about 1:20.

13. A composition simulating granite or onyx comprising the cured product of
A. an intimately mixed and substantially airless thermosettable molding composition comprising:
between about 10 to about 25 parts by weight of a polyester comprising the reaction product of (i) at least one acyclic ethylenically unsaturated dicarboxylic acid or anhydride thereof (ii) at least one aromatic dicarboxylic acid and (iii) a $C_2$-$C_8$ glycol;
between about 10 to about 25 parts by total weight of at least two ethylenically unsaturated monomers; and
between about 50 to about 80 parts by weight of a filler selected from the group consisting of alumina trihydrate, borax, hydrated magnesium, calcium carbonate and calcium sulfate dihydrate;
B. an aesthetically acceptable amount of discrete chips of an at least partially cured synthetic resin, said chips having a mean particle size of greater than 50 microns; and
C. an effective amounts of a first free radical producing curing agent which is initiated at a temperature of between about 100° F. and about 200° F. and a second free-radial producing curing agent which is initiated at a temperature of between about 150° F. and 300° F.

14. The composition of claim 13 wherein said chips have a minimum particle size of about 50 microns and a maximum particle size of about 25,000 microns.

15. The composition of claim 13 wherein said chips comprise between about 1% and about 50% by weight of said composition.

16. The composition of claim 13 wherein said synthetic resin comprises the at least partially cured reaction product of:
between about 10 to about 25 parts by weight of a polyester comprising the reaction product of (i) at least one acyclic ethylenically unsaturated dicarboxylic acid or anhydride thereof (ii) at least one aromatic dicarboxylic acid and (iii) a $C_2$-$C_8$ glycol;
between about 10 to about 25 parts by weight of an ethylenically unsaturated monomer; and
between about 50 to about 80 parts by weight of a filler selected from the group consisting of alumina trihydrate, borax, hydrated magnesium, calcium carbonate and calcium sulfate dihydrate.

17. The composition of claim 13 wherein said ethylenically unsaturated monomers are styrene and methyl methacrylate in a weight ratio of between about 2:1 to about 1:4.

18. The composition of claim 16 wherein said ethylenically unsaturated monomer of said partially cured reaction product is a mixture of styrene and methyl methacrylate in a weight ratio of between about 2:1 to about 1:4.

19. The composition of claim 18 wherein the particle size of said filler is between from about 0.1 to about 50 microns.

20. The composition of claim 19 wherein the mean particle size is between about 5 microns and 20 microns and the particle size distribution is such that smaller particles substantially fill the interstices between larger particles.

21. The composition of claim 18 wherein said composition further comprises between about 0.15 and about 3.0 parts by weight of a curing agent selected from the group consisting of 2,5-dimethyl 2,5-bis(2-ethylhexanoylperoxy) hexane and 1,1-di-t-butyl peroxy-3,3,5-trimethyl cyclohexane.

22. The composition of claim 13 wherein said aromatic dicarboxylic acid is selected from the group consisting of phthalic acid and isophthalic acid.

23. The composition of claim 13 wherein said acyclic ethylenically unsaturated dicarboxylic acid is selected from the group consisting of maleic acid, fumaric acid, linoleic acid, linolenic acid, itaconic acid, oleic acid, and anhydrides thereof.

24. The composition of claim 13 wherein said glycol is selected from the group consisting of neopentyl glycol, 1,4-butanediol, 1,6-hexanediol, 1,4-cyclohexanediol, ethylene glycol, propylene glycol, dipropylene glycol, diethylene glycol, butylene trimethylene glycol, and triethylene glycol.

25. The composition of claim 13 wherein said at least one of said ethylenically unsaturated monomers is selected from the group consisting of alkyl acrylates, alkyl methacrylates, hydroxyalkyl acrylates, hydroxyalkyl methacrylates, N,N-dialkylaminoalkyl acrylates, N,N-dialkylaminoalkyl methacrylates, styrene, vinyl acetate, acrylonitrile, methacrylonitrile, maleic acid, maleic anhydride, maleic acid esters, acryl amide, methacrylamide, itaconic acid, itaconic anhydride, itaconic acid ester, alkylene diacrylate, alkylene dimethacrylates, N-hydroxymethyl-acrylamide, diallyl phthalate, divinylbenzene, vinyl toluene, divinyltoluene, trimethylolpropane triacrylate, trimethylolpropane trimethacrylate, pentaerythritol tetraacrylate, pentaerythritol tetramethacrylate, triallyl citrate, and triallyl cyanurate and mixtures thereof.

26. The composition of claim 25, wherein said alkyl acrylate is selected from the group consisting of methyl acrylate, ethyl acrylate, n-propyl acrylate, i-propyl acrylate, n-butyl acrylate, 2-butyl acrylate, i-butyl acrylate, t-butyl acrylate, 2-ethylhexyl acrylate, and cyclohexyl acrylate.

27. The composition of claim 25 wherein said ethylenically unsaturated monomers are styrene and methyl methacrylate.

28. The composition of claim 27 wherein said styrene and methyl methacrylate are in a weight ratio of between about 2:1 and about 1:4.

29. The composition of claim 13 wherein said first curing agent is 2,5-dimethyl-2,5-bis(2-ethyl hexanoylperoxy) hexane and said second curing agent is 1,1-di-t-butyl peroxy-3,3,5-trimethylcyclohexane.

30. The composition of claim 16 wherein the aromatic dicarboxylic acid of said cured reaction product is selected from the group consisting of phthalic acid and isophthalic acid.

31. The composition of claim 16 wherein the acyclic ethylenically unsaturated dicarboxylic acid of said cured reaction product is selected from the group consisting of maleic acid, fumaric acid, linoleic acid, linolenic acid, itaconic acid, oleic acid, and anhydrides thereof.

32. The composition of claim 16 wherein the glycol of said cured reaction product is selected from the group consisting of neopentyl glycol, 1,4-butanediol, 1,6-hexanediol, 1,4-cyclohexanediol, ethylene glycol, propylene glycol, dipropylene glycol, diethylene glycol, butylene trimethylene glycol, and triethylene glycol.

33. The composition of claim 16 wherein the ethylenically unsaturated monomer of said cured reaction product is selected from the group consisting of alkyl acrylates, alkyl methacrylates, hydroxyalkyl acrylates, hydroxyalkyl methacrylates, N,N-dialkylaminoalkyl acrylates, N,N-dialkylaminoalkyl methacrylates, styrene, vinyl acetate, acrylonitrile, methacrylonitrile, maleic acid, maleic anhydride, maleic acid esters, acryl amide, methacrylamide, itaconic acid, itaconic anhydride, itaconic acid ester, alkylene diacrylate, alkylene dimethacrylates, N-hydroxymethyl-acrylamide, diallyl phthalate, divinylbenzene, vinyl toluene, divinyltoluene, trimethylolpropane triacrylate, trimethylolpropane trimethacrylate, pentaerythritol tetraacrylate, pentaerythritol tetramethacrylate, triallyl citrate, and triallyl cyanurate and mixtures thereof.

34. The composition of claim 33 wherein said alkyl acrylate is selected from the group consisting of methyl acrylate, ethyl acrylate, n-propyl acrylate, i-propyl acrylate, n-butyl acrylate, 2-butyl acrylate, i-butyl acrylate, t-butyl acrylate, 2-ethylhexyl acrylate, and cyclohexyl acrylate.

35. The composition of claim 16 wherein said ethylenically unsaturated monomer is selected from the group consisting of styrene and methyl methacrylate.

36. The composition of claim 35 wherein said ethylenically unsaturated monomer comprises a mixture of styrene and methyl methacrylate.

37. The composition of claim 36 wherein said styrene and said methyl methacrylate are in a weight ratio of between about 2:1 and about 1:4.

* * * * *